United States Patent
Dhulipala et al.

(10) Patent No.: US 9,912,635 B2
(45) Date of Patent: Mar. 6, 2018

(54) AUTO PROVISIONING OF BULK ACCESS POINTS

(71) Applicant: Aruba Networks, Inc., Sunnyvale, CA (US)

(72) Inventors: Suresh Dhulipala, Bangalore (IN); Venkatesh Kannan, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 249 days.

(21) Appl. No.: 14/809,143

(22) Filed: Jul. 24, 2015

(65) Prior Publication Data
US 2017/0026335 A1    Jan. 26, 2017

(51) Int. Cl.
*H04L 29/12* (2006.01)
*H04L 12/24* (2006.01)

(52) U.S. Cl.
CPC ...... *H04L 61/2015* (2013.01); *H04L 41/0806* (2013.01); *H04L 61/6068* (2013.01)

(58) Field of Classification Search
CPC ............. H04L 61/2015; H04L 41/0806; H04L 61/6068
See application file for complete search history.

(56) References Cited

U.S. PATENT DOCUMENTS

| | | | | |
|---|---|---|---|---|
| 2011/0252237 | A1* | 10/2011 | PalChaudhuri | ....... H04L 9/3226 713/168 |
| 2014/0204803 | A1* | 7/2014 | Nguyen | ............. H04L 41/5054 370/255 |
| 2014/0355609 | A1* | 12/2014 | Riddel | .................... H04L 45/02 370/392 |
| 2016/0366711 | A1* | 12/2016 | Shanbhag | ............. H04L 69/165 |

* cited by examiner

*Primary Examiner* — Brian J Gillis
*Assistant Examiner* — Amy Ling
(74) *Attorney, Agent, or Firm* — Hewlett Packard Enterprise Patent Department

(57) ABSTRACT

Provided are devices, computer-program products, and methods for automatic provisioning of an access point. In some implementations, a network device may connect to a network. Connecting may include automatically receiving a group name. In some implementations, a dynamic host configuration protocol (DHCP) request may be transmitted. A DHCP response message may also be received. The DHCP response message may provide an Internet Protocol (IP) address. The IP addressed may facilitate communication by the network device with the network. Controller information may be received. The controller information may include a controller IP address. Provisioning information may be requested. This request may include the group name and the controller IP address. Provisioning information may be received. Provisioning information may be associated with the controller IP address. The provisioning information may facilitate self-configuration of a network device. The operation of the network device may be configured using the provisioning information.

87 Claims, 13 Drawing Sheets

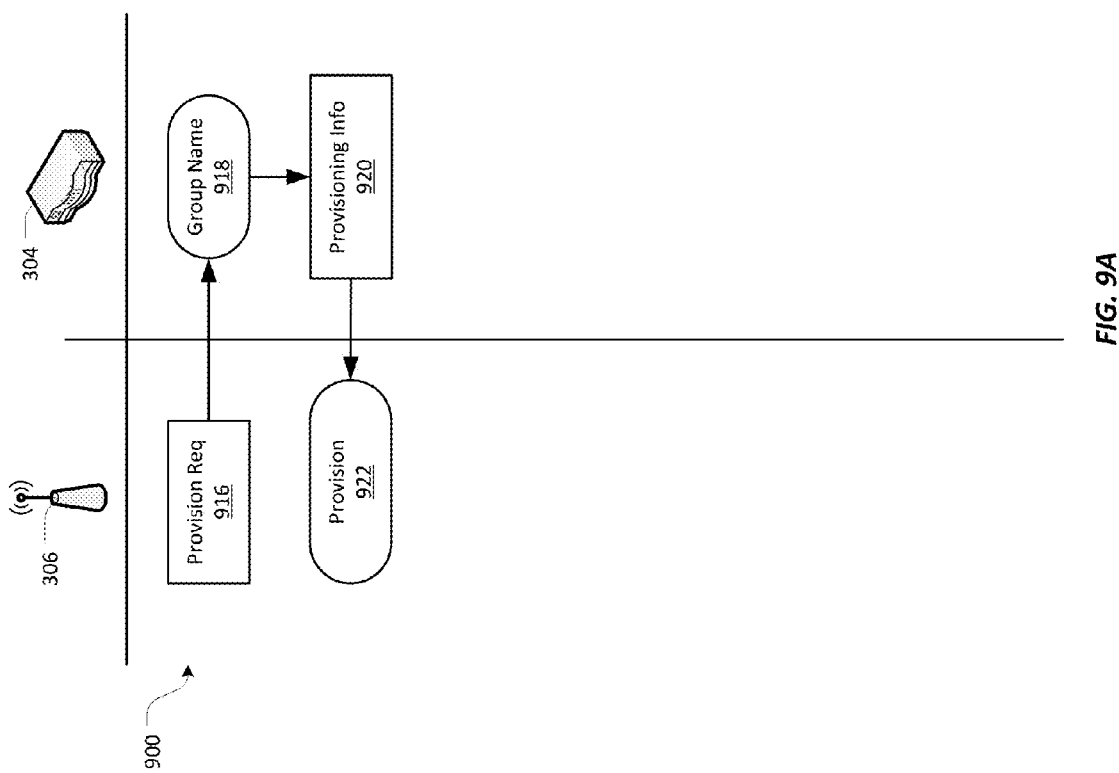

AUTO PROVISIONING OF BULK ACCESS POINTS

SUMMARY

A network deployment at an enterprise site may include many access points. An enterprise network deployment may include hundreds or thousands of access points. When a network is initially deployed at an enterprise site, potentially hundreds or thousands of access points must be configured before the network is operational.

Provided are devices, computer-program products, and methods (e.g., methods implemented by a network device), for automatic provisioning of an access point. In some implementations, a network device may connect to a network. Connecting may include automatically receiving a group name. In some implementations, a dynamic host configuration protocol (DHCP) request may be transmitted. A DHCP response message may also be received. The DHCP response message may provide an Internet Protocol (IP) address. The IP addressed may facilitate communication by the network device with the network. In some implementations, controller information may be received. The controller information may include a controller IP address. In some implementations, provisioning information may be requested. This request may include the group name and the controller IP address. In some implementations, provisioning information may be received. In these implementations, provisioning information may be associated with the controller IP address. The provisioning information may facilitate self-configuration of a network device. In some implementations, the operation of the network device may be configured using the provisioning information.

In some implementations, the DHCP response message may include the controller IP address. In some implementations, the controller IP address may be included in DHCP option 43. In some implementations, the controller IP address may be included in DHCP option 60.

In some implementations, receiving the group name may include extracting the group name from the DHCP response message. In some implementations, the group name may be based on the IP address provided by the DHCP response. In some implementations, the group name may be included in DHCP option 43. In other implementations, the group name may be included in DHCP option 60.

In some implementations, connecting includes connecting to a port on a multi-port network infrastructure device. In some implementations, receiving the group name may include receiving a message from the multi-port network infrastructure device. The message may include the group name. In some implementations, the group name may be based on an identity of the port that has been connected to. In other implementations, the message from the multi-port network infrastructure device may comprise a link layer discover protocol (LDDP) message with type-length-value (TLV) structures. In some implementations, a TLV may include the group name.

In some implementations, a message may be received from the multi-port network infrastructure device. In these implementations, the message may include the controller IP address. In some implementations, the message may comprise a link layer discovery protocol (LLDP) message with type-length-value (TLV) structures. In some implementations, a TLV may include the controller IP address. In some implementations, the multi-port network infrastructure device may be a switch.

In some implementations, provisioning information may include radiofrequency settings. In other implementations, provisioning information may include network identifiers. In yet other implementations, provisioning information may include security settings.

In some implementations, further configuration information may be received. In these implementations, the further configuration information may be based on the group name.

In some implementations, a network device may connect to a network. In some implementations, a dynamic host configuration protocol (DHCP) message may be transmitted. In some implementations, a DHCP response message may be received. In these implementations, the DHCP response message may provide an Internet Protocol (IP) address. The IP address may facilitate communication by the network device with the network. In some implementations, controller information is received. The controller information may include a controller IP address. In some implementations, provisioning information is requested. The provisioning information may include the IP address and the controller IP address. In some implementations, provisioning information is received. In these implementations, the provisioning information may be associated with the controller IP address. The provisioning information may also be associated with a group name. The provisioning information may facilitate self-configuration of a network device. In some implementations, operation of the network device may be configured using the provisioning information.

In some implementations, the DHCP response message may include the controller IP address. In some implementations, the controller IP address is included in DHCP option 43. In other implementations, the controller IP address is included in DHCP option 60.

In some implementations, a link layer discovery protocol (LLDP) message may be received. In these implementations, the LLDP message may include type-length-value (TLV) structures. A TLV may include the controller IP address.

In some implementations, requesting provisioning information may include contacting a controller associated with the controller IP address. In some implementations, receiving provisioning information may include receiving a group name associated with the provisioning information. In some implementations, the group name is based on the IP address provided by the DHCP response.

In some implementations, provisioning information may include radiofrequency settings. In other implementations, provisioning information may include network identifiers. In yet other implementations, provisioning information may include security settings.

In some implementations, further configuration information may be transmitted. In these implementations, the further configuration information may be based on the group name.

Provided are devices, computer-program products, and methods (e.g., methods implemented by a network device), for automatic provisioning of an access point. In some implementations, a network device may receive a request for provisioning information. In some implementations, a group name is determined. In these implementations, the group name may be determined using information provided in the request. In some implementations, provisioning information is selected. In these implementations, selecting the provisioning information includes using the group name. In some implementations, the selected provisioning information is transmitted. In these implementations, provisioning information facilitates self-configuration of un-provisioned network devices.

In some implementations, determining the group name may include extracting the group name from the request.

In some implementations, determining the group name may include extracting an Internet Protocol (IP) address from the request. In these implementations, the group name may be based on the extracted IP address. In some implementations, all IP addresses in a subnet may be assigned to a group name. In other implementations, a range of IP addresses in a subnet may be assigned to a group name. In yet other implementations, an individual IP address may be assigned to a group name.

In some implementations, provisioning information may include radiofrequency settings. In other implementations, provisioning information may include network identifiers. In yet other implementations, provisioning information may include security settings.

In some implementations, re-configuration information may be transmitted. In these implementations, the re-configuration information may be based on the group name.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by embodiments and optional features, modification and variation of the concepts herein disclosed may be resorted to by those skilled in the art, and that such modifications and variations are considered to be within the scope of the systems and methods as defined by the appended claims.

BRIEF DESCRIPTION OF THE DRAWINGS

Illustrative embodiments are described in detail below with reference to the following figures:

FIGS. 9A-9B illustrate examples of processes for automated bulk provisioning of access points using a controller.

DETAILED DESCRIPTION

Figure 1:
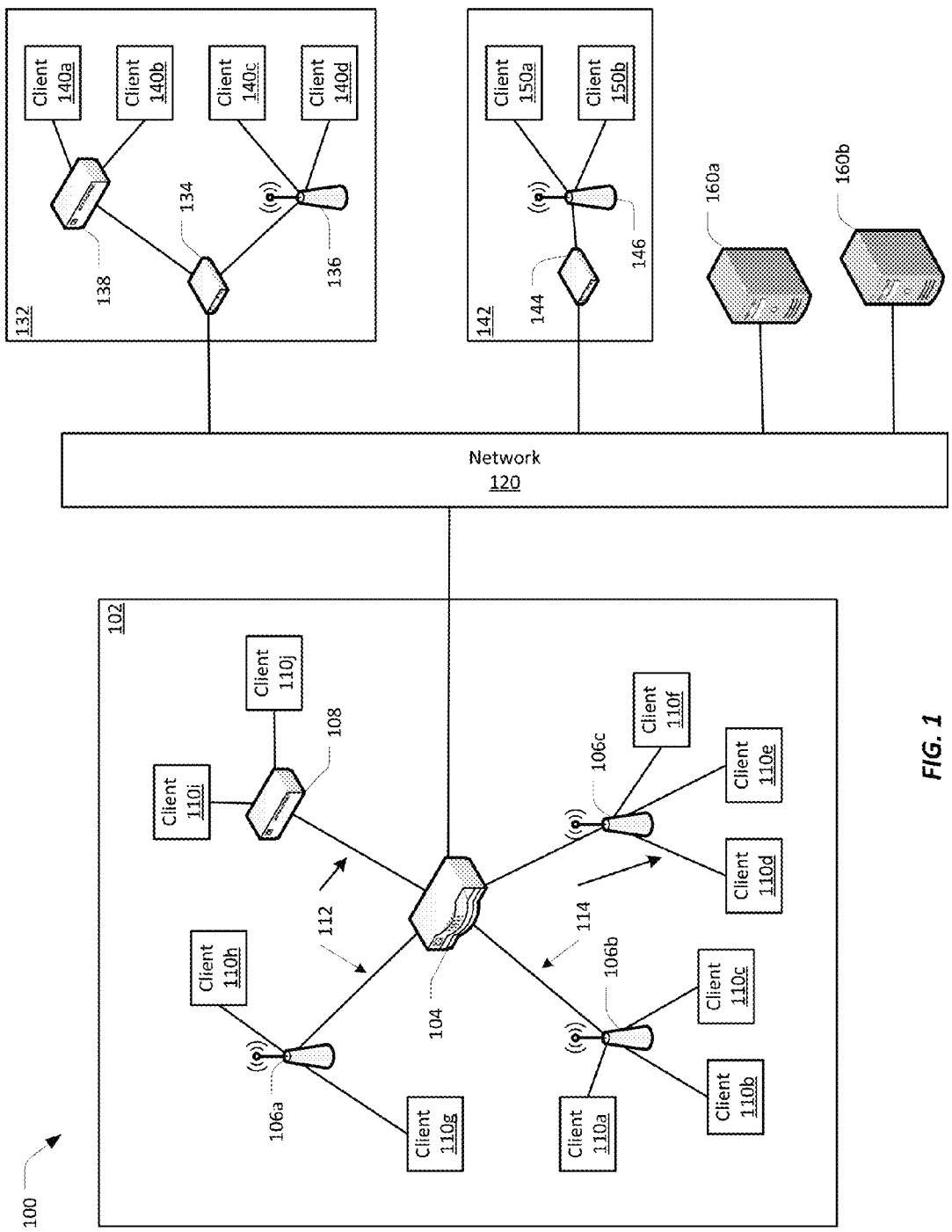
FIG. 1 illustrates one embodiment of a network configuration that may be implemented for a multi-user organization, such as a business, educational institution, governmental entity, or any other organization having multiple users and possibly multiple sites.

A network deployment at an enterprise site may include many wireless access points. It may be desirable to provide wireless network services in all areas of enterprise sites such as office complexes, university campuses, hospitals, airports, shopping areas, and the like. Providing wireless network coverage to such large areas may require hundreds or possibly thousands of wireless access points. During the initial deployment of the network, these access points may need to be configured, for example to apply network identifiers, security settings, and other parameters that may be desired for the deployment site. Even after initial deployment, some or all of the access points may need to be re-configured, to apply updated or changed settings. Configuration and re-configuration also may occur when one or more new access points are added to an already established network.

In some cases, an access point may be configured by a network administrator. This may involve having the network administrator (a person) log into the access point, using, for example, a default address or specific address for the access point. The network administrator may then manually provision the access point. An enterprise network deployment, however, may include hundreds or thousands of access points. An enterprise network describes a network that may be implemented at a large site, such as an office complex, a university campus, a government facility, a hospital, or any other location that may include multiple buildings, floors, departments, servers, subnetworks or subnets, many client devices, and a large number of users. When a network is initially deployed at an enterprise site, potentially hundreds or thousands of access points must be configured before the network is operational. For a network administrator to log into and provision each access point would be time-consuming and impractical.

In many cases the access points in an enterprise network may have a common configuration. A common configuration allows for uniformity of service and simplifies network management. In such cases, the burden of provisioning hundreds or thousands of access points may be solved by pre-provisioning the access points, that is, provisioning the access points before they are deployed at the deployment site. For example, the access points may be provisioned before leaving the factory, and/or at the network administrator's office before installation. In some cases, however, pre-provisioning the access points prior to deployment may still require a network administrator to log into each access point to provide configuration information. Moreover, it may not be desirable to provide sensitive provisioning information, such as network identifiers, passwords, and other security information, to a third party, such as the factory. Pre-provisioning also does not provide a way to propagate configuration changes after the access points have been deployed and the network is operational. After deployment, to change the access point configuration, a network administrator would have to log in to each access point to update the access points' configuration.

Additionally, one enterprise site may include multiple configurations. For example, different access point configurations may be provided for each building, department, floor, or function. In another example, an enterprise site might have different types or generations of access points, which do not all support the same configuration. Moreover, access points may provide overlapping coverage. For example, a highly secure wireless network may be provided for employees, while a less secure network is provided for guests, and these networks may cover the same areas, such as conference rooms. When an enterprise site includes multiple access point configurations, the access points may be segregated into groups, where each group provides wireless services to one, for example, physical area or department. Access point groups, however, further complicate provisioning of the access points at a site. This becomes an additional burden for the network administrator who is manually provisioning the access points: the network administrator must first identify which group an access point belongs to before he or she can provision the access point. Pre-provisioning the access points would require providing the configuration for each group to the person or entity providing the pre-provisioning. The pre-provisioned access points would then have to be labeled and deployed according to their assigned groups.

Deployment of hundreds or thousands of access points may be facilitated by systems and methods to provision the access points in an automated fashion. Upon connecting the access point to a network, a device in the network may identify the group to which the access point should belong. The group identity may then be used to provide provisioning information, and the provisioning information may be used to automatically provision each access point. After being provisioned, the access points will be ready to provide wireless network service.

I. Network Configurations

FIG. 1 illustrates one embodiment of a network configuration 100 that may be implemented for a multi-user organization, such as a business, educational institution, governmental entity, or any other organization having multiple users and possibly multiple physical or geographical sites. The network configuration 100 may include a main office 102 in communication with a network 120. The network configuration 100 may also include one or more remote sites 132, 142, also in communication with the network 120.

The main office 102 may include a primary network, possibly also called a corporate network or a home network. The main office 102 network may be a private network. A private network is a network that may include security and access controls, such that only certain users are authorized to access the private network. Authorized users may include, for example, employees of a company based in the main office 102.

In the illustrated example, the main office 102 includes a controller 104 in communication with the network 120. The controller 104 may provide communication with the network 120 for the main office 102, though it may not be the only point of communication with the network 120 for the main office 102. A single controller 104 is illustrated, though the main office may include multiple controllers and/or multiple communication points with network 120. In some embodiments, the controller 104 communicates with the network 120 through a router (not illustrated). In other embodiments, the controller 104 provides router functionality to the devices in the main office 102.

A controller 104 may be operable to configure and manage network devices, such as in the main office 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points 106a-c. Switches 108 and wireless access points 106a-c provide network connectivity to various client devices 110a j. Using a connection to a switch 108 or access point 106a-c, a client device 110a-j is able to access network resources, including other devices on the network and the network 120.

Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, printers, and the like.

Within the main office 102, a switch 108 is included as one example of a point of access to the network for wired client devices 110i-j. Client devices 110i-j may connect to the switch 108 and, through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless access points 106a-c are included as another example of a point of access to the network for client devices 110a-h. An access point 106a-c is a combination of hardware, software, and/or firmware that is configured to provide wireless network connectivity to wireless client devices 110a-h. In the illustrated embodiment, the access points 106a-c can be managed and configured by the controller 104. The access points 106a-c communicate with the controller 104 and the network over either wired 112 or wireless 114 connections.

The network configuration 100 may include one or more remote sites 132. A remote site 132 may be located in a different physical or geographical location from the main office 102. In some cases, the remote site 132 may be in the same geographical location, or possibly the same building, as the main office 102, but lacks a direct connection to the network located within the main office 102, relying instead on a connection over a different network 120. A remote site 132 such as the one illustrated may be, for example, a satellite office. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or access point 136 in communication with the gateway device 134 over either wired or wireless connections. The switch 138 and access point 136 provide connectivity to the network for various client devices 140a-d.

In various embodiments, the remote site 132 is in direct communication with main office 102, such that client devices 140a-d at the remote site 132 access the network resources at the main office 102 as if these client devices 140a-d were located at the main office 102. In such embodiments, the remote site 132 is managed by the controller 104 at the main office, and the controller 104 provides the necessary connectivity, security, and accessibility that enable the remote site's 132 communication with the main office 102. Once connected to the main office 102, the remote site 132 may function as a part of a private network provided by the main office 102.

In various embodiments, the network configuration 100 may include one or more smaller remote sites 142, comprising only a gateway device 144 for communicating with the network 120 and a wireless access point 146, by which various client devices 150a-b access the network 120. Such a remote site 142 may represent, for example, an individual employee's home or a temporary remote office. The remote site 142 may also be in communication with the main office 102, such that the client devices 150a-b at remote site 142 access network resources at the main office 102 as if these client devices 150a-b were located at the main office 102. The remote site 142 may be managed by the controller 104 at the main office 102 to make this transparency possible. Once connected to the main office 102, the remote site 142 may function as a part of a private network provided by the main office 102.

The network 120 may be a public network, such as the Internet. A public network is a network that may be shared by any number of entities, including the illustrated network configuration 100. A public network may have unrestricted access, such that any user may connect to it. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, that are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
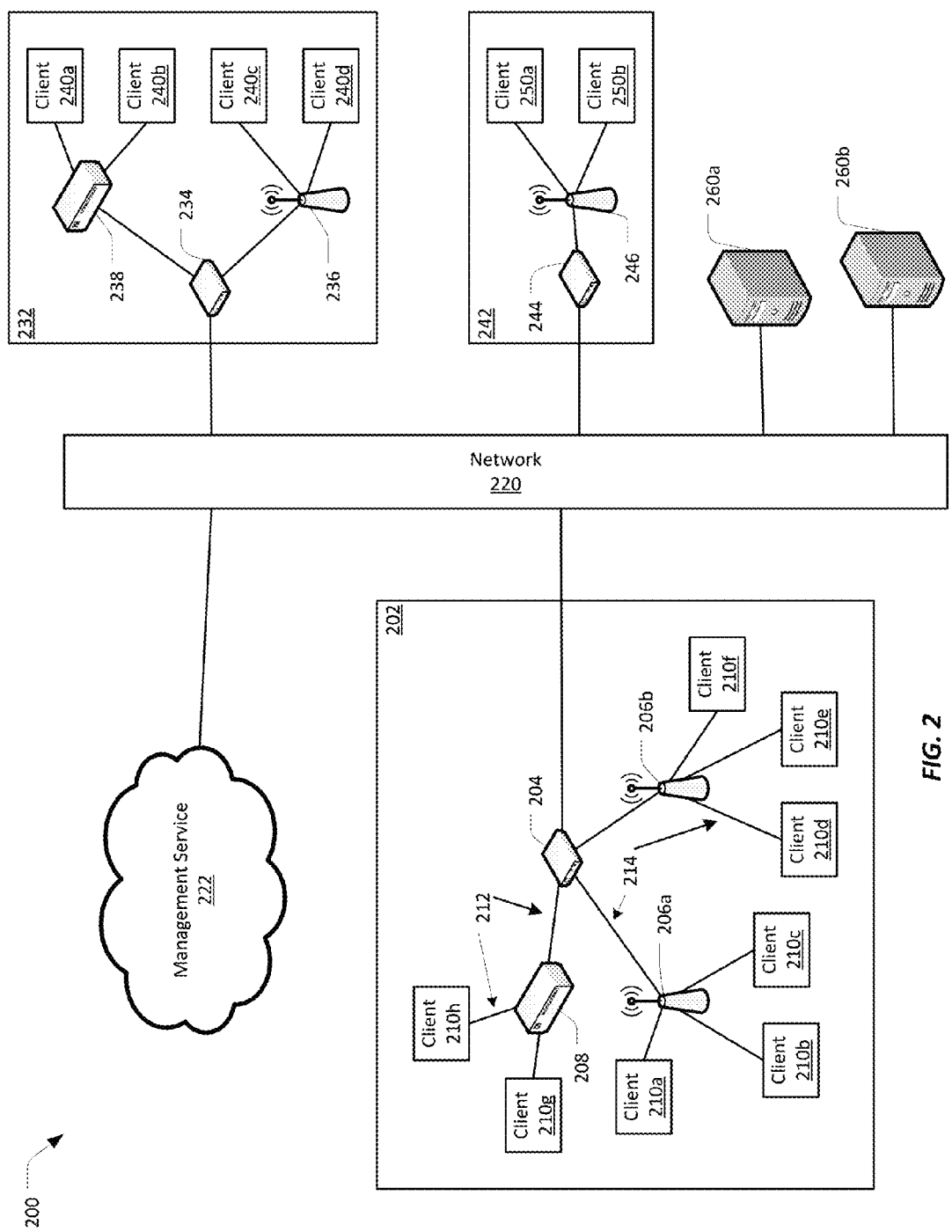
FIG. 2 illustrates an embodiment of a network configuration that includes a cloud-based management service.

FIG. 2 illustrates an embodiment of a network configuration 200 that includes a cloud-based management service 222. The network configuration 200 may be implemented for a multi-user organization. The network configuration 200 includes a main office 202 in communication with a network 220, and may also include one or more remote sites 232, 242, also in communication with the network 220. In the illustrated embodiment, the main office 202 includes a gateway device 204, such as a router, for communicating with the network 220. A single gateway device 204 is illustrated, though the main office 202 may include multiple gateway devices and/or multiple communication points with the network 220.

The gateway device 204 may be in communication with one or more switches 208 and/or wireless access points 206a-b. Switches 208 and access points 206a-b provide network connectivity to various client devices 210a-h. Using a connection to a switch 208 or access point 206a-b, a client device 210a-h is able to access network resources, including other devices on the network and the network 220.

A switch 208 is included as an example of a point of access to the network for client devices 210g-h. Client devices 210g-h may communicate with the switch 208 over a wired 212 connection. Wireless access points 206a-b are included as another example of a point of access to the network for client devices 210a-f. Client devices 210a-f may communicate with the access points 206a-b over wireless 214 connections. The access points 206a-b may themselves communicate with the gateway device 204 over either wired 212 or wireless 214 connections.

In some embodiments, the network configuration 200 may include a cloud-based management service 222. The management service 222 may include various software and software processes for configuring and/or managing network devices at the main office 202. Management tasks may include, for example, access, authentication, security, hardware management, and/or internal and/or external communication. The management service 222 may be running on a server local to the main office 202, or a server located remotely from the main office 202, or may be distributed across any number of local and/or remote servers. In embodiments where the management service 222 is located remote to the main office 202, the management service 222 may access the main office 202 over the network 220.

The network configuration 200 may include one or more remote sites 232, 242. A remote site 232 may include a gateway device 234 for communicating with the network 220. The remote site 232 may also include a switch 238 and/or access point 236 in communication with the gateway device 234 over either wired or wireless connections. The switch 238 and access point 236 provide connectivity to the network 220 for various client devices 240a-d.

In various embodiments, the remote site 232 may be configured and/or managed by the management service 222, such that client devices 240a-d at the remote site 232 access the network resources at the main office 202 as if these client devices 240a-d were located at the main office 202. The management service 222 provides the necessary connectivity, security, and accessibility that enable the remote site's 232 communication with the main office 202.

In various embodiments, the network configuration 200 may also include one or more smaller remote sites 242, comprising only a gateway device 244 for communicating with the network 220 and a wireless access point 246, by which various client devices 250a-b access the network 220. The remote site 242 may also be configured and/or managed by the management service 222, such that the client devices 250a-b at the remote site 242 access network resources at the main office 202 as if these client devices 250a-b were located at the main office 202. The management service's 222 control over the remote site 242 makes this transparency possible.

The network 120 may be a public network, such as the Internet. The network 120 may include various content servers 260a-b. The client devices 210a-h, 240a-d, 250a-b may request and access data and content provided by the content servers 260a-b over their connection to the network 120.

II. Access Point Provisioning System

The example networks illustrated in FIGS. 1-2 may include multiple access points. In most cases, when an access point is connected to a network, such as the networks illustrated in FIGS. 1-2, the access point may need to be configured before it can provide wireless network services to client devices. In some cases, a network administrator may configure each access point. The network administrator may log into the access point, and manually enter the access point's configuration information. A network configuration, however, may include hundreds or thousands of access points. For a network administrator to log into each of thousands of access points to configure each access point may be time-consuming and impractical. In some cases, the access points may be provisioned prior to being deployed into the network. Pre-provisioning, however, may include providing security information to a third party, which may not be practical or desirable. Furthermore, when the access points require a configuration change, or if a decision is made to deploy the access points with a different configuration than originally contemplated, a network administrator may still have to log into each access point to enter the configuration change.

Embodiments disclosed herein provide systems and methods for automatic bulk provisioning of access points. In this context, "bulk" means provisioning a large number of access points with the same or almost the same configuration. Also in this context, "provision" or "provisioning" means to provide configuration information that enables an access point to become operational, within desired parameters. More generally, "provision" or "provisioning means the process of preparing and equipping an access point to be able to provide network services to associated client devices.

Figure 3:
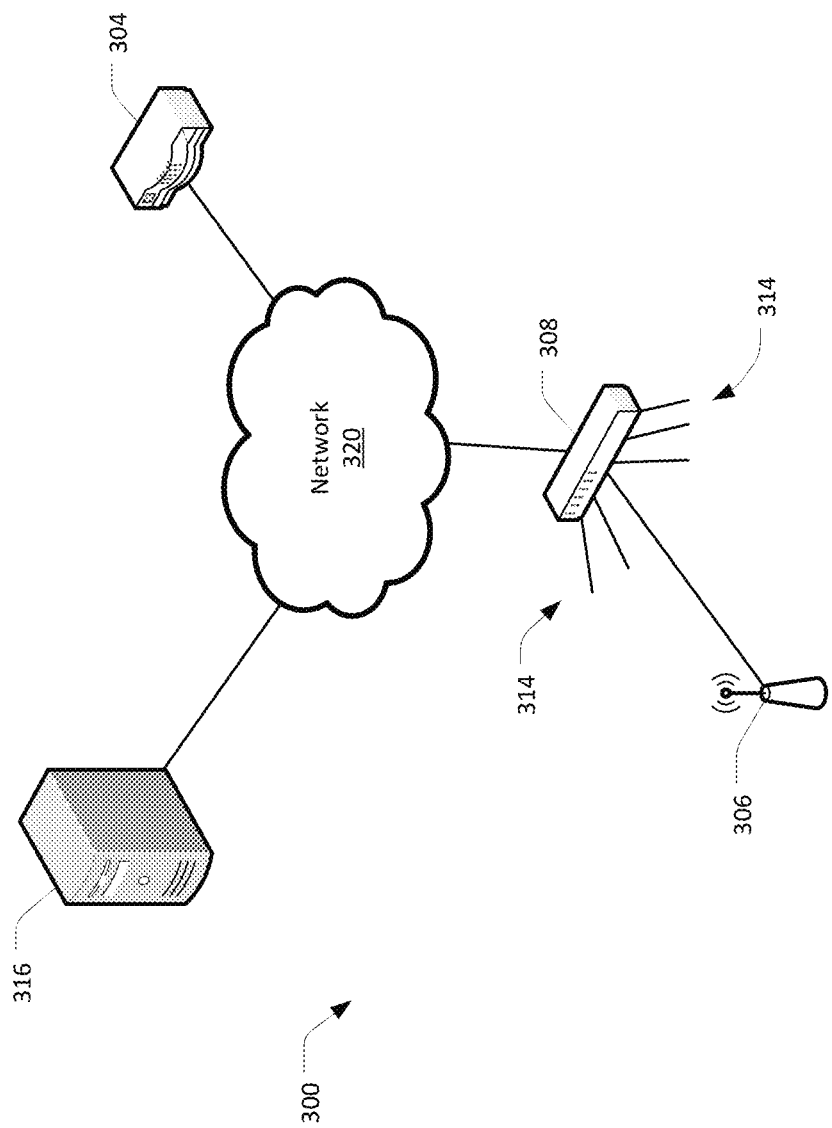
FIG. 3 illustrates an example of a system that may be used to provision one of many access points.

FIG. 3 illustrates an example of a system 300 that may be used to provision one of many access points. The example system 300 illustrates how one access point 306 may be connected to a network 320. Hundreds or thousands of access points may each be connected to the network 320 in a similar fashion. In the illustrated example, the access point 306 is connected to a multi-port network infrastructure device 308. The multi-port network infrastructure device 308 may be connected to the network 320. A dynamic host configuration protocol (DHCP) server 316 may also be connected to the network 320, and may be in communication with the access point 306 through the network 320 and the multi-port network infrastructure device 308. A controller 304 may also be connected to the network 320, and may also be in communication with the access point 306.

As noted above, in this example the access point 306 is connected to the network 320 by way of a multi-port network infrastructure device 308. A multi-port network infrastructure device is a hardware component that may be used to construct a network. A multi-port network infrastructure device provides two or more ports. A port may be used to connect to the multi-port network infrastructure device and thereby connect to a network. Examples of devices that may connect to a multi-port network infrastructure device include client devices, such as desktop computers, laptop computers, servers, game consoles, and the like, and other network infrastructure devices, such as switches, hubs, bridges, routers, gateways, and other such devices. In some cases, a device connects to a multi-port network infrastructure device with a physical cable. In other cases, a device may connect to a multi-port network infrastructure device with a wireless connection. In such cases, the multi-port network infrastructure device may provide wireless ports. Examples of multi-port network infrastructure devices include switches, hubs, bridges, routers, mid-span devices, and modems and other gateway devices. A multi-port network infrastructure device may also be a combined device, such as a modem, gateway, or router with integrated switching capability. In some circumstances, an access point may be connected to the network via a network infrastructure device with a single downstream port (e.g., a single port to connect to access points or other network devices) and a single upstream port (e.g., a single port to connect the network infrastructure device to the network), such as a residential version router, cable modem, Digital Subscriber Line (DSL) model, or similar (not shown).

In the example system 300, the example access point 306 is connected to one of multiple ports 314 provided by the multi-port network infrastructure device 308. The access point 306 may communicate to the network 320 through the multi-port network infrastructure structure device 308. The network 320 may be a localized network, such as a local area network (LAN) or a larger network that may include one or more subnets. In some cases, the network 320 may include other networks, and/or public networks, such as the Internet.

The example system 300 may also include a DHCP server 316. A DHCP server is a server that implements the DHCP protocol. The DHCP protocol allows the DHCP server to automatically assign IP addresses to a device that wants to join a network. In many cases, a DHCP server is configured to provide IP addresses within a specific range. The range of IP address may include, for example, the IP addresses provided for a single subnet. A DHCP server typically operates in a dynamic fashion, assigning IP addresses automatically when devices join a network, and ensuring that each device is assigned an IP address that is unique at least within the network 320. The DHCP server 316 may also distribute other information, such as the addresses of local routers, time servers, name servers, domain name servers (DNS), and the like. The DHCP server 316 may be a hardware server configured to run the DHCP protocol. Alternatively, the DHCP server 316 may be a process running on a computing system.

The example system 300 may also include a controller 304. A controller may be configured to configure and manage network devices, such as access points, switches, routers, and client devices. In some cases, the controller 304 may be a master controller. A master controller 304 may be configured to manage and provision some or all of the access points connected to the network 320. In some cases, the system 300 may include more than one controller. In such cases, the access point 306 may be managed by a local controller, and another controller 304 may be designated as a master controller. The local controller may be responsible for managing the access point 306, while the master controller may be responsible for provisioning the access point 306.

As noted above, to provision an access point generally means to provide the access point with configuration settings. These settings describe how the access point is to operate. For example, the access point may be configured with network identifiers, such as security set identifiers (SSIDs). Network identifiers may be used by client devices to identify and connect to a network. As another example, the access point may be configured with security settings, such as firewalls and/or passwords. As yet another example, the access point may be configured with radio settings, such as transmission power, channels, and/or Multiple-Input and Multiple Output (MIMO) capability.

Two or more access points may have the same configuration. These access points may have the same configuration, for example, because they are configured to provide seamless wireless coverage over one area of a site. Seamless wireless coverage means that a client device may disconnect from one access point and connect with a different access point (sometimes called "roaming") without any interruption of service. Access points with the same configuration may be assigned to a group. For example, a group of access points may provide wireless network service for the work area of an office, while a different group of access points provide coverage for the conference room area, while yet another group provides coverage for an auditorium area. Each of these areas may have different configurations. For example, the work area may have high security settings, while the conference room may have low security settings but more limited network access. Each group of access points may be given a name that a network administrator may use to identify the group. For example, the groups in the prior example may be named "work_area", "conference_rooms" and "auditorium."

Sub-dividing access points into groups, which may be helpful to network functionality, may complicate provisioning of the access points. A network administrator that is configuring the network may first have to identify the group to which the access point should belong before he or she can configure the access point with the desired configuration. The system 300 of FIG. 3, however, may make use of group names in automating the process of provisioning bulk access points. As described in further detail below, in various embodiments, automated provisioning of bulk access points may be provided for the system 300.

III. Automated Provisioning of Access Points

As noted above, the system 300 of FIG. 3 can, in various embodiments, be used to provision any number of access points in an automated fashion. The process for automatically provisioning access points may begin when an access point 306 connects to a network 320. For example, the access point 306 may connect to the multi-port network infrastructure device 308 with a cable. In connecting to the network 320, the access point 306 may automatically receive a group name. This group name may identify an access point group to which the access point will belong. Upon connecting to the network, the access point 306 may transmit a DHCP request message to a DHCP server 316 connected to the network 320. The access point 306 may subsequently receive a DHCP response message from the DHCP server 316. The DHCP response message may include an IP address. The access point 306 may use this IP address as its address for communicating with the network 320. The access point 306 may further receive controller information. This controller information may include the IP address of the controller 304. The access point 306 may subsequently request provisioning information. This request may include the IP address of the controller 304. The request may be directed to the controller 304. This request may contain information about the access point 306, such as configurations or protocols supported by the access point, versions or model numbers, and the like. The access point 306 may subsequently receive provisioning information from the controller 304. Having received provisioning information, the access point 306 may configure its operations using the provisioning information. Thereafter, the access point 306 may be available to provide network services to client devices.

In some implementations, the access point may not receive a group name. For example, all access points in a network or subnet may be configured with the same configuration. In this example, the access points are not divided into groups, and thus may not be provided with a group name. As another example, an access point may have a default group name that is available when the access point is powered on. In these implementations, the access point 306 may connect to the network 320 and not receive a group name. The access point 306 may proceed to transmit a DHCP request and receive a DHCP response, where the DHCP response provides the access point 306 with an IP address. The access point 306 may further receive controller information that includes the IP address of a controller 304. The access point 306 may request provisioning information, using the controller IP address. The access point 306 may subsequently receive provisioning information. The access point 306 may then use the provisioning information to configure its operations.

Figure 4:
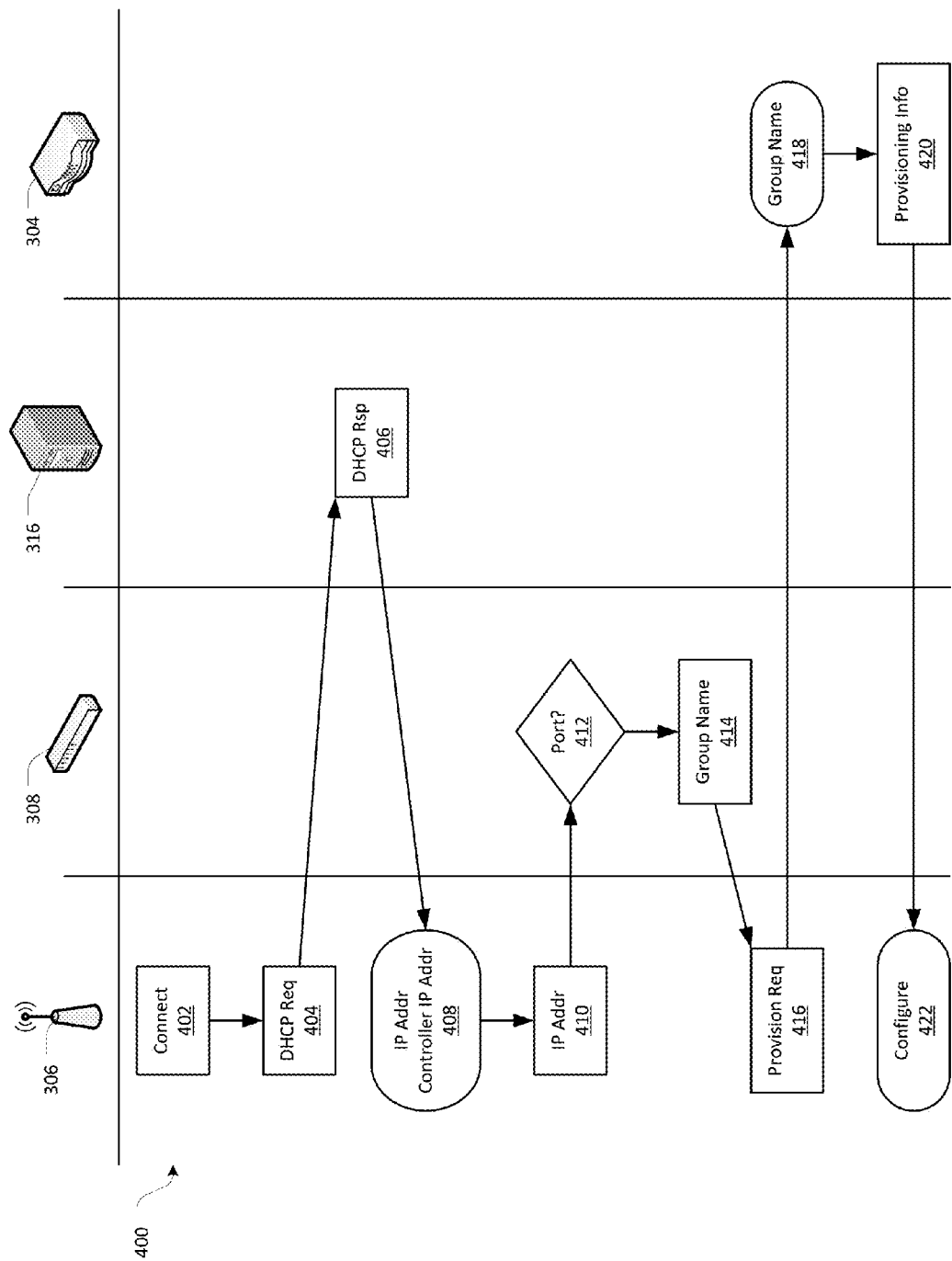
FIG. 4 illustrates one example of a process for automated bulk provisioning of access points, where an access point's group name is determined from a port on a multi-port network infrastructure device to which the access point is connected.

FIG. 4 illustrates one example of a process 400 for automated bulk provisioning of access points. In the illustrated process 400, an access point 306 may interact with a multi-port network infrastructure device 308, a DHCP server 316, and/or a controller 304, each of which is described with respect to FIG. 3. The steps of the process 400 of FIG. 4 occur automatically when the access point 306 is connected to a network, and do not require prompting from a human network administrator. In some cases, however, the process 400 may be facilitated by actions taken by a network administrator. For example, in a large installation of new access points, bulk (or any) provisioning may be suspended until all access point are installed or the network administrator otherwise indicates that provisioning should occur. The steps of the process 400 are described as applying to one access point 306, however, the same process 400 can be applied to any or all access points connected to the network either sequentially, at approximately the same time, or some combination thereof.

In FIG. 4, at step 402, the access point 306 may be connected to a network. For example, a network administrator may connect the access point 306 with a multi-port network infrastructure device 308 using a physical cable. Alternatively, at step 402 the access point 306 may connect wirelessly with the multi-port network infrastructure device 308. The access point 306 may also have been previously physically connected to the network, and at step 402 the access point 306 may alternatively initiate steps to establish a connection that allows the access point 306 to communicate with the network. Alternatively or additionally, the access point 306 may detect an existing connection to the network and proceed with the further steps of the process 400. Alternatively or additionally, the access point 306 may be made—for example, by a network administrator pressing a button on the access point 306—to detect a connection to the network and proceed with the further steps of the process 400.

At step 404, the access point 306 may transmit a DHCP request to obtain an IP address. An IP address is one of several ways in which the access point 306 identifies itself to the network. An IP address allows the access point 306 to communicate with the network, and further allows devices in the network to communicate with the access point 306. The DHCP request may be broadcast to the network, with the expectation that the DHCP server 316 will receive the DHCP request.

At step 406, the DHCP server 316 may receive the DHCP request and generate a DHCP response. The DHCP response may include an IP address for the access point 306. The DHCP response may also include other information that may be used by the access point 306. For example, the DHCP response may include the IP address of the controller 304. The controller 304 IP address may be provided in an optional field in the DHCP response. Optional fields, or "options," may be used by the DHCP server 316 to transmit optional configuration parameters. DHCP options have assigned numbers and names, but some options may be used according to how the DHCP server 316 is configured. For example, the controller 304 IP address may be placed in option 43, which is designated for Vendor Specific Information. Alternatively or additionally, the controller 304 IP address may be placed in option 60, which is designated as the Vendor Class Identifier. The controller 304 IP address may alternatively or additionally be placed in other options, including optional and extension options. Vendor-related options, however, are designated for use by a vendor, and placing information such as the controller 304 IP address in these options is least likely to affect inter-operability with other network devices.

At step 408, the access point 306 may receive the DHCP response. As noted above, the DHCP response may include an IP address for the access point 306. In some implementations, the DHCP response may also include the address of the controller 304, and possibly other information.

Having obtained an IP address, at step 410, the access point 306 may communicate its IP address to the multi-port network infrastructure device 308. For example, the access point 306 may transmit a Link Layer Discovery Protocol (LLDP) message to the multi-port network infrastructure device 308. The multi-port network infrastructure device 308 may use the access point's 306 IP address to direct or route packets between the network and the access point 306. An LLDP message from the access point 306 may contain other information, such as a system name and description, a port name and description, a virtual local area network (VLAN) name, an IP management address, system capabilities (switching, routing, etc.), Media Access Control (MAC) and/or physical (PHY) information, power information, and/or link aggregation (methods of combining multiple network connections in parallel in order to increase throughput beyond what a single connection could sustain) information. An LLDP message may also include any amount of optional information. LLDP messages may be broadcast by the access point 306 and/or the multi-port network infrastructure device 308, so that the access point's 306 information may be distributed to other parts of the network.

At step 412, the multi-port network infrastructure device 308 may identify the port to which the access point 306 is connected. The multi-port network infrastructure device 308 may use information obtained from an LLDP message from the access point 306. Alternatively or additionally, the multi-port network infrastructure device 308 may detect that the access point 306 is connected to one of its ports. For example, the multi-port network infrastructure device 308 may detect power or communication signals on that port.

At step 414, the multi-port network infrastructure device 308 may use the port identified in step 412 to identify an access point group name. The multi-port network infrastructure device 308 may be configured such that each of its ports is assigned to a different access point group. Alternatively or additionally, a range of ports may be assigned to an access point group. For example, ports 1-5 may be assigned to the group "work_area", ports 6-10 may be assigned to the group "conference_rooms", and ports 10-15 may be assigned to the group "auditorium." Alternatively or additionally, discontinuous ports (e.g., all odd or all even port numbers, or every third port, etc.) may be assigned to an access point group. Alternatively, all of the multi-port network infrastructure device's 308 ports may be assigned to the same access point group.

At step 414, multi-port network infrastructure device 308 may communicate the identified group name to the access point 306. For example, the multi-port network infrastructure device 308 may transmit an LLDP message to the access point 306. An LLDP message is typically composed of a series of type-length-value (TLV) structures. A TLV may include a type, indicating the type of the data stored in the TLV. A TLV may also include a length, indicating the length of the value stored in the TLV. A TLV may optionally also include a value. An LLDP may include mandatory TLVs, such as a chassis identifier, a port identifier, and/or a time-to-live identifier. LLDP messages may also include any number of optional TLVs. An optional TLV may be used to transmit the access point's 306 group name to the access point 306. For example, an LLDP may include a TLV of type 127 (commonly used for custom TLVs) and an alphanumeric value that includes the group name (each character possibly encoded in an 8-bit value).

A multi-port network infrastructure device may be configured with one or more access point group profiles. A profile may be assigned to one or more of the multi-port network infrastructure device's 308 ports. Table 1 and Table 2 illustrate two examples of profiles that may be assigned to a port. The "LLDP Protocol Data Unit (PDU) transmit" parameter indicates whether an LLDP to the access point 306 should be transmitted. The "AP_Group TLV" (Access Point Group TLV) parameter indicates whether the LLDP to the access point 306 should include an access point group name. The "AP_Group Name" (Access Point Group Name) parameter gives the name of the access point group provided by the profile.

TABLE 1

| LLDP Profile "device-group-work" | |
| --- | --- |
| Parameter | Value |
| LLDP PDU transmit | Enabled |
| AP_Group TLV | Enabled |
| AP_Group Name | work_area |

TABLE 2

| LLDP Profile "device-group-conf" | |
| --- | --- |
| Parameter | Value |
| LLDP PDU transmit | Enabled |
| AP_Group TLV | Enabled |
| AP_Group Name | conference_rooms |

In some implementations, the multi-port network infrastructure device 308 may also be configured to provide the IP address of the controller 304 to the access point 306. For example, the above-described LLDP profiles may include the controller 304 IP address. Furthermore, an LLDP message from the multi-port network infrastructure device 308 to the access point 306 may include a TLV containing the controller 304 IP address. Configuring the multi-port network infrastructure device 308 to transmit the controller 304 IP address may provide an alternate or additional method to supply the controller 304 IP address to the access point 306.

At step 416, the access point 306 may receive the LLDP message containing its group name, and generate a provisioning request. The access point 306 may include its group name in the provisioning request. The provisioning request may further include the IP address of the controller 304. Inclusion of the controller 304 IP address may cause the controller 304 to accept the provisioning request. In some implementations, the provisioning request may be in the form a Universal Datagram Protocol (UDP) type message. For example, the access point 306 may transmit a Process Application Protocol Interface (PAPI) message. PAPI is a proprietary protocol used by Aruba Networks, Inc. for communication between access points and controllers PAPI uses UDP port 8211. Use of this specific protocol is not necessary, and the access points and/or controllers involved may also use other standardized or proprietary protocols for communication between them. In some implementations, the provisioning request is not specifically a request for provisioning. In these implementations, the provisioning request may be a message that indicates that the access point 306 is un-provisioned, and/or a message that indicates that the access point 306 is incorrectly provisioned.

At step 418, the controller 304 may receive the provisioning request from the access point 306. As noted above, the provisioning request may include the access point's 306 group name. The controller 304 may be configured with configuration profiles for each designated access point group at the deployment site. Each configuration profile contains the provisioning information for a named group. The controller 304 may use the group name provided by the provisioning request to select the provisioning information that is suitable for the access point 306. Alternatively, the controller 304 may select default provisioning information. For example, the controller 304 may provide default provisioning information when the controller 304 does not recognize the group name provided with the provisioning request. At step 420, the controller 304 may transmit the selected provisioning information to the access point 306. The controller 304 may, for example, send a UDP type message, such as a PAPI message, containing the provisioning information. Alternatively or additionally, the controller 304 may transmit a series of messages, each containing a portion of the provisioning information.

At step 422, the access point 306 may receive the provisioning information from the controller 304. Upon receiving the provisioning information, the access point 306 may configure its operations. Configuring the access point's 306 operations may include automatically applying the configuration settings provided by the provisioning information. Thereafter, the access point 306 may be ready to supply wireless services to client devices.

In some implementations, the access point 306 may be pre-loaded with configuration profiles. A configuration profile may be included for each designated group at a deployment site. Alternatively or additionally, one or more default configuration profiles, with default group names, may be included. In these implementations, the access point 306 may be able to configure its operations upon receiving its group name. In such cases, the access point 306 may not receive or may ignore the controller 304 IP address provided by either the DHCP response generated at step 406 or an LLDP message from the multi-port network infrastructure device 308 generated at step 414. Furthermore, in these cases the access point 306 may not transmit a provisioning request, as at step 416, and may instead proceed to step 422.

In other implementations, the access point 306 may be able to provision itself without a group name. This may be the case, for example, when all the access points at a deployment site or all access points in communication with the same controller are to have the same configuration. For example, at step 402, the access point 306 may be configured with a default group name that is available once the access point 306 has powered up. The access point 306 may include this default group name in the provisioning request transmitted at step 416. Alternatively, the access point 306 may be pre-loaded with configuration profiles. In such cases, the access point 306 may select a pre-loaded configuration profile, using the default group name, and configure itself with the provisioning information provided by this configuration profile.

The steps included in the process 400 may also be used to reconfigure the access point 306 at a later time. For example, when a change to the configuration for a specific access point group is to be made, the configuration profile for the group may be changed at the controller 304. The controller 304 may thereafter broadcast messages to the network, such as PAPI messages, that indicate the configuration change. These messages may include the group name. Access points that belong to that group may recognize that the messages are intended for their group, may accept the messages, and may use the message content to reconfigure themselves. Alternatively or additionally, the controller 304 may maintain lists of which access points are in which groups, and, instead of broadcasting messages, may direct messages to each specific access point that is a member of the group. In other implementations, the multi-port network infrastructure device 308 may transmit an LLDP message to some or all of the access points connected to it, such as the access point 306. This LLDP message may indicate to the access point 306 that the access point 306 should re-request provisioning information, as at step 416. For example, the LLDP message may include a TLV that instructs the access point 306 to reconfigure. Upon receipt of provisioning information, as at step 422, the access point may proceed to reconfigure itself.

Changing an access point's group name may also be facilitated by steps included by the process 400. For example, to change the group name of the access point 306, the multi-port network infrastructure device 308 may transmit an LLDP message to the access point 306, where the LLDP message includes the new group name. Upon receipt of this message, the access point 306 may automatically initiate a provisioning request, as at step 416, where the provisioning request includes the new group name. Upon receipt of provisioning information, as at step 422, the access point may proceed to reconfigure itself.

Figure 5:
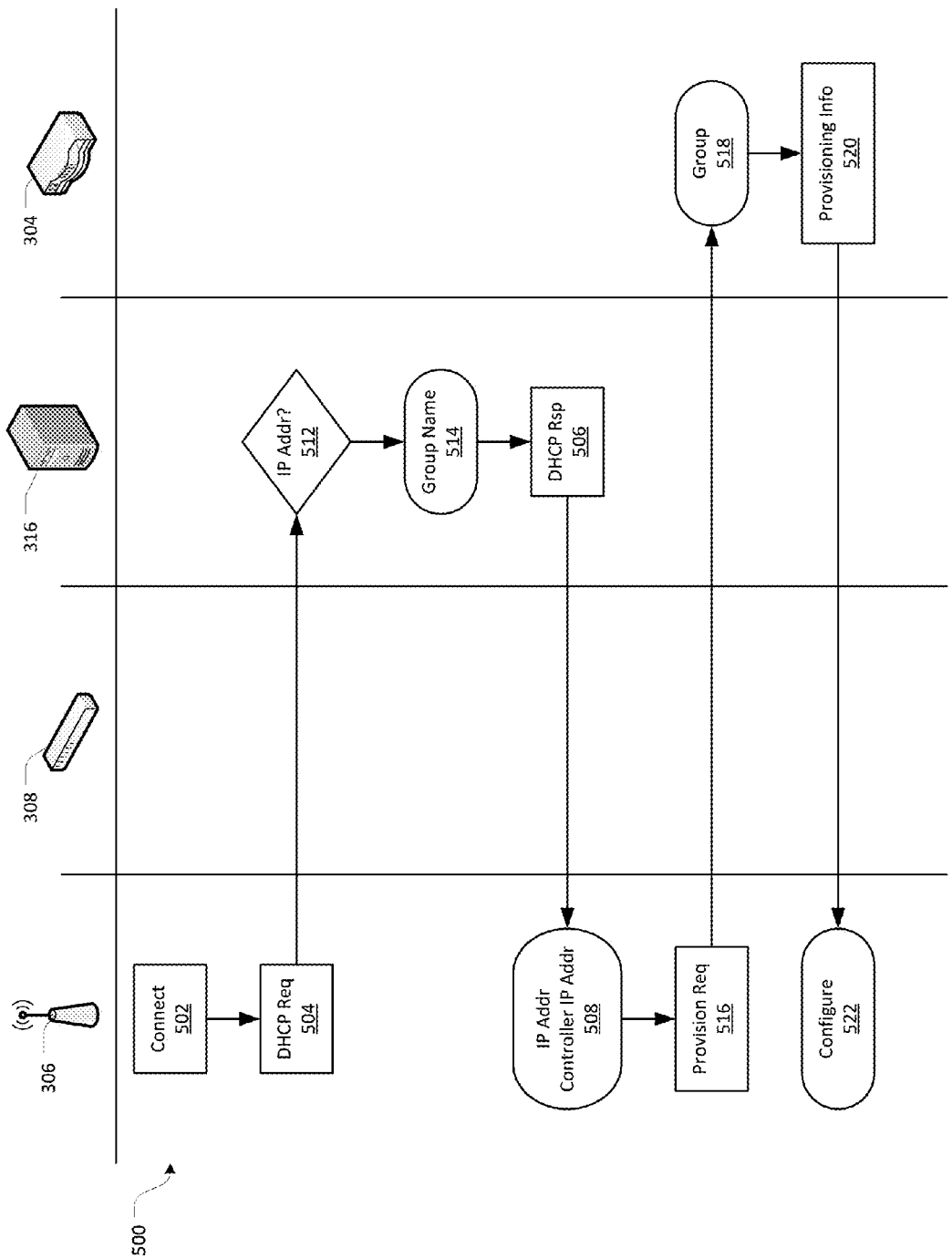
FIG. 5 illustrates another embodiment of a process for automated bulk provisioning of access points, where an access point's group name is determined from an IP address assigned to the access point by a DHCP server.

FIG. 5 illustrates another embodiment of a process 500 for automated bulk provisioning of access points. In the illustrated process 500, an access point 306 may interact with a multi-port network infrastructure device 308, a DHCP server 316, and/or a controller 304, each of which is described with respect to FIG. 3. The steps of the process 500 of FIG. 5 occur automatically when the access point 306 is connected to a network, and do not require prompting from a network administrator. In some cases, however, the process 500 may be facilitated by actions taken by a network administrator. The steps of the process 500 are described as applying to one access point 306; however, the same process 500 can be applied to any or all access points connected to the network.

In FIG. 5, at step 502, the access point 306 may be connected to a network. For example, a network administrator may connect the access point 306 with a multi-port network infrastructure device 308 using a physical cable. Alternatively, at step 502, the access point 306 may connect wirelessly with the multi-port network infrastructure device 308. The access point 306 may also have been previously physically connected to the network, and at step 502 the access point 306 may alternatively initiate steps to establish a connection that allows the access point 306 to communicate with the network. Alternatively or additionally, the access point 306 may detect an existing connection to the network and proceed with the further steps of the process 500. Alternatively or additionally, the access point 306 may be made—for example, by a network administrator pressing a button on the access point 306—to detect a connection to the network and proceed with the further steps of the process 500.

At step 504, the access point 306 may transmit a DHCP request to obtain an IP address. An IP address is one of several ways in which the access point 306 identifies itself to the network. An IP address allows the access point 306 to communicate with the network, and further allows devices in the network to communicate with the access point 306. The DHCP request may be broadcast to the network, with the expectation that the DHCP server 316 will receive the DHCP request.

At step 512, the DHCP server 316 may receive the DHCP request. At this step, the DHCP server 316 may determine an IP address to assign to the access point 306. The DHCP server 316 may base its selection on a number of factors, such as where the access point 306 is physically located, the access point's physical connection to the network, and/or any parameters sent by the access point 306 in its DHCP request.

Having determined the IP address that is to be assigned to the access point 306, the DHCP server 316 may, at step 514, determine the access point's 306 group name, using the assigned IP address. The DHCP server 316 may be configured to assign certain IP addresses to various devices in the network, including access points. The DHCP server 316 may further be configured such that each IP address that it may assign to an access point is designated as belonging to a different group. Alternatively or additionally, the DHCP server 316 may be configured such that ranges of IP addresses are assigned to different groups. For example, the IP address range 10.1.1.100 through 10.1.1.150 (fifty addresses) may be assigned to the group "work_area" while the address range 10.1.1.151 through 10.1.1.200 may be assigned to the group "conference_rooms." Alternatively or additionally, all the IP addresses in a subnet may be assigned to a group. Subnets group together a number of logically related devices, and allow them to present a single IP address to other networks and devices. This allows routers to route packets intended for any device within the subnet to the same IP address (typically the IP address of an interface of a router or other subnet device assigned to that subnet) without needing to determine the exact address of the intended device. Once a packet reaches the subnet device to which the IP address has been assigned, the subnet device uses other address information to determine the address of the intended device.

An example of a DHCP server configuration using options 43 and 60 is provided below. The DHCP server 316 may use this example configuration when generating a response to the DHCP request from the access point 306. Furthermore, this configuration would not be applied when the DHCP server 316 responds to DHCP requests from devices that are not access points.

```
option masterip code 43 = ip-address;
option vendor-class-identifier code 60 = string;
group {
    option masterip 10.1.1.245;
    option vendor-class-identifier "ArubaAP;APGroupName1";
    subnet 20.1.1.0 netmask 255.255.255.0 {
        range 10.1.1.100 10.1.1.150;
        option subnet-mask 255.255.255.0;
        option broadcast-address 10.1.1.255;
        option routers 10.1.1.245;}
}
```

At step 506, the DHCP server 316 may generate a DHCP response. The DHCP response may include the group name identified at step 514. The DHCP response may also include the IP address for the access point 306. The DHCP response may also include other information that may be used by the access point 306. For example, the DHCP response may include the IP address of the controller 304. In some implementations, the DHCP server 316 may be configured to identify DHCP requests from access points, and may further be configured to include the controller 304 IP address in a response to DHCP requests from an access point. The DHCP server 316 may further be configured to provide the controller 304 IP address only to access point 306. In other implementations, the DHCP server 316 may be configured to provide the controller 304 IP address in response to any DHCP request. In yet other implementations, the DHCP server 316 may be configured to provide the controller 304 IP address only for certain IP addresses selected at step 512.

The group name and/or controller 304 IP address may be provided in optional fields in the DHCP response. For example, the controller 304 IP address may be placed in option 43, which is designated for Vendor Specific Information, and the group name may be placed in option 60, which is designated as the Vendor Class Identifier. The group name and/or controller 304 IP address may alternatively or additionally be placed in other options, including optional and extension options. Vendor-related options, however, are designated for use by a vendor, and placing information such as the group name and/or controller 304 IP address in these options is least likely to affect interoperability with other network devices.

At step 508, the access point 306 may receive the DHCP response. As noted above, the DHCP response may include an IP address for the access point 306. The DHCP response may also include the group name that is assigned to the access point 306. In some implementations, the DHCP response may also include the address of the controller 304, and possibly other information.

At step 516, the access point 306 may generate a provisioning request. The access point 306 may include its group name in a provisioning request. The provisioning request may further include the IP address of the controller 304. Inclusion of the controller 304 IP address may cause the controller 304 to accept the provisioning request. In some implementations, the provisioning request may be in the form a UDP-type message. For example, the access point 306 may transmit a PAPI message. In some implementations, the provisioning request is not specifically a request for provisioning. In these implementations, the provisioning request may be a message that indicates that the access point 306 is un-provisioned, and/or a message that indicates that the access point 306 is incorrectly provisioned.

At step 518, the controller 304 may receive the provisioning request from the access point 306. As noted above, the provisioning request may include the access point's 306 group name. The controller 304 may be configured with configuration profiles for each designated access point group at the deployment site. Each configuration profile contains the provisioning information for a named group. The controller 304 may use the group name provided by the provisioning request to select the provisioning information that is suitable for the access point 306. Alternatively, the controller 304 may select default provisioning information. For example, the controller 304 may provide default provisioning information when the controller 304 does not recognize the group name provided with the provisioning request. At step 520, the controller 304 may transmit the provisioning information to the access point 306. The controller 304 may, for example, send a UDP type message, such as a PAPI message, containing the provisioning information. Alternatively or additionally, the controller 304 may transmit a series of messages, each containing a portion of the provisioning information.

At step 522, the access point 306 may receive the provisioning information from the controller 304. Upon receiving the provisioning information, the access point 306 may configure its operations. Configuring the access point's 306 operations may include automatically applying the configuration settings provided by the provisioning information. Thereafter, the access point 306 may be ready to supply wireless services to client devices.

In some implementations, the access point 306 may be pre-loaded with configuration profiles. A configuration profile may be included for each designated group at a deployment site. Alternatively or additionally, default configuration profiles, with default group names, may be included. In these implementations, the access point 306 may be able to configure its operations upon receiving its group name. In such cases, the access point 306 may not receive or may ignore the controller 304 IP address provided by the DHCP response generated at step 506. Furthermore, in these cases, the access point 306 may not transmit a provisioning request, as at step 516, and may instead proceed to step 522.

In other implementations, the access point 306 may be able to provision itself without a group name. This may be the case, for example, when all the access points at a deployment site or all access points in communication with the same controller are to have the same configuration. For example, at step 502, the access point 306 may be configured with a default group name that is available once the access point 306 has powered up. The access point 306 may include this default group name in the provisioning request transmitted at step 516. Alternatively, the access point 306 may be pre-loaded with configuration profiles. In such cases, the access point 306 may select a pre-loaded configuration profile, using the default group name, and configure itself with the provisioning information provided by this configuration profile.

The steps included in the process 500 may also be used to reconfigure the access point 306 at a later time. For example, when a change to the configuration for a specific access point group is to be made, the configuration profile for the group may be changed at the controller 304. The controller 304 may thereafter broadcast messages to the network, such as PAPI messages, that indicate the configuration change. These messages may include the group name. Access points that belong to that group may recognize that the messages are intended for their group, may accept the messages, and may use the message content to reconfigure themselves. Alternatively or additionally, the controller 304 may maintain lists of which access points are in which groups, and, instead of broadcasting messages, may direct messages to each specific access point that is a member of the group. In other implementations, the DHCP server may generate a DHCP response, as at step 506. Receipt of this DHCP response may indicate to the access point 306 that it should reconfigure. The access point 306 may subsequently re-request provisioning information, as at step 516. Upon receipt of provisioning information, as at step 522, the access point may proceed to reconfigure itself.

Changing an access point's group name may also be facilitated by the steps included in the process 500. For example, to change the group name of the access point 306, the DHCP server may transmit a DHCP response, as at step 506, which includes the new group name. Upon receipt of this DHCP response, the access point 306 may automatically initiate a provisioning request, as at step 516, where the provisioning request includes the new group name. Upon receipt of provisioning information, as at step 522, the access point may proceed to reconfigure itself.

Figure 6:
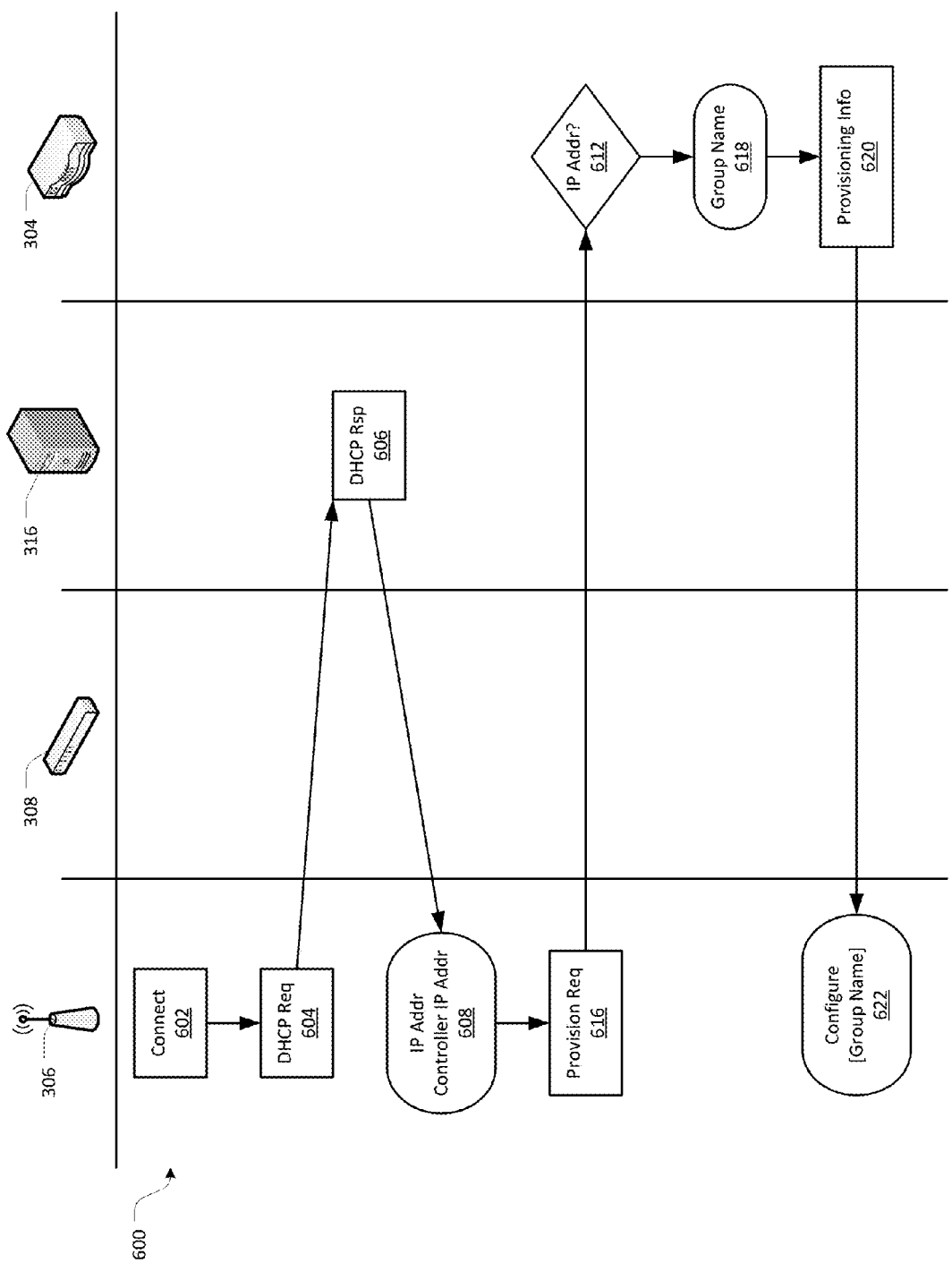
FIG. 6 illustrates another embodiment of a process 600 for automated provisioning of bulk access points, where an access point's group name is determined by a controller from the access point's IP address.

FIG. 6 illustrates another embodiment of a process 600 for bulk provisioning of access points. In the illustrated process 600, an access point 306 may interact with a multi-port network infrastructure device 308, a DHCP server 316, and/or a controller 304, each of which is described with respect to FIG. 3. The steps of the process 600 of FIG. 6 occur automatically when the access point 306 is connected to a network, and do not require prompting from a network administrator. In some cases, however, the process 600 may be facilitated by actions taken by a network administrator. The steps of the process 600 are described as applying to one access point 306; however, the same process 600 can be applied to any or all access points connected to the network.

In FIG. 6, at step 602, the access point 306 may be connected to a network. For example, a network administrator may connect the access point 306 with a multi-port network infrastructure device 308 using a physical cable. Alternatively, at step 602, the access point 306 may connect wirelessly with the multi-port network infrastructure device 308. The access point 306 may also have been previously physically connected to the network, and at step 602 the access point 306 may alternatively initiate steps to establish a connection that allows the access point 306 to communicate with the network. Alternatively or additionally, the access point 306 may detect an existing connection to the network and proceed with the further steps of the process 600. Alternatively or additionally, the access point 306 may be made—for example, by a network administrator pressing a button on the access point 306—to detect a connection to the network and proceed with the further steps of the process 600.

At step 604, the access point 306 may transmit a DHCP request to obtain an IP address. An IP address is one of several ways in which the access point 306 identifies itself to the network. An IP address allows the access point 306 to communicate with the network, and further allows devices in the network to communicate with the access point 306. The DHCP request may be broadcast to the network, with the expectation that the DHCP server 316 will receive the DHCP request.

At step 606, the DHCP server 316 may generate a DHCP response. The DHCP response may include the IP address for the access point 306. The DHCP response may also include other information that may be used by the access point 306. For example, the DHCP response may include the IP address of the controller 304. The controller 304 IP address may be provided in optional fields in the DHCP response. For example, the controller 304 IP address may be placed in option 43, which is designated for Vendor Specific Information. Alternatively or additionally, the group name may be placed in option 60, which is designated as the Vendor Class Identifier. The controller 304 IP address may alternatively or additionally be placed in other options, including optional and extension options. Vendor-related options, however, are designated for use by a vendor, and placing information such as the group name and/or controller 304 IP address in these options is least likely to affect inter-operability with other network devices.

At step 608, the access point 306 may receive the DHCP response. As noted above, the DHCP response may include an IP address for the access point 306. In some implementations, the DHCP response may also include the address of the controller 304, and possibly other information.

At step 616, the access point 306 may generate a provisioning request. This provisioning request may include the IP address assigned to the access point 306. The access point 306 may also include the IP address of the controller 304. Inclusion of the controller 304 IP address may cause the controller 304 to accept the provisioning request. In some implementations, the provisioning request may be in the form a UDP-type message. For example, the access point 306 may transmit a PAPI message. In some implementations, the provisioning request is not specifically a request for provisioning. In these implementations, the provisioning request may be a message that indicates that the access point 306 is un-provisioned, and/or a message that indicates that the access point 306 is incorrectly provisioned.

At step 612 the controller 304 may receive the provisioning request from the access point 306. The controller 304 may, at step 618, determine the access point's 306 group name, using the IP address provided with the provisioning request. The controller 304 may be configured to manage a number of IP addresses within the network. The controller 304 may further be configured such that each IP address that may be assigned to an access point is designated as belonging to a certain access point group. For example, each IP address designated for access points may be assigned to a different access point group. Alternatively or additionally, the controller 304 may be configured such that ranges of IP addresses are assigned to different groups. For example, the IP address range 172.168.24.25 through 172.168.56.250 may be assigned to the group "work_area" while the IP address range 1.1.24.25 through 1.1.25.250 may be assigned to the group "conference_rooms". This example may be provided to the controller 304 as the following example parameters.

```
#provision-ap range 172.168.24.25 to 172.168.56.250 ap-group
WORK_AREA
#provision-ap range 1.1.24.25 to 1.1.25.250 ap-group
CONFERENCE_ROOMS
```

Alternatively or additionally, all the IP addresses in a subnet may be assigned to a group.

The controller 304 may be configured with configuration profiles for each designated access point group at the deployment site. Each configuration profile contains the provisioning information for a named group. The controller 304 may use the group name determined at step 618 to select the provisioning information that is suitable for the access point 306. At step 620, the controller 304 may transmit the provisioning information to the access point 306. The controller 304 may, for example, send a UDP type message, such as a PAPI message, containing the provisioning information. Alternatively or additionally, the controller 304 may transmit a series of messages, each containing a portion of the provisioning information.

At step 622, the access point 306 may receive the provisioning information from the controller 304. Upon receiving the provisioning information, the access point 306 may configure its operations. Configuring the access point's 306 operations may include automatically applying the configuration settings provided by the provisioning information. Thereafter, the access point 306 may be ready to supply wireless services to client devices. At step 622, the access point 306 may, in some implementations, also receive its group name. The access point 306 may store its group name for later uses.

In some implementations, the access point 306 may be pre-loaded with configuration profiles. A configuration profile may be included for each access point group at a deployment site. Alternatively or additionally, default configuration profiles, with default group names, may be included. In these implementations, the access point 306 may be able to configure its operations upon receiving its group name. In such cases, the access point 306 may not receive or may ignore the controller 304 IP address provided by the DHCP response generated at step 606. Furthermore, in these cases, the access point 306 may not transmit a provisioning request, as at step 616, and may instead proceed to step 622.

In other implementations, the access point 306 may be able to provision itself without a group name. This may be the case, for example, when all the access points at a deployment site or all the access points in communication with the same controller are to have the same configuration. For example, at step 602, the access point 306 may be configured with a default group name that is available once the access point 306 has powered up. The access point 306 may include this default group name in the provisioning request transmitted at step 616. Alternatively, the access point 306 may be pre-loaded with configuration profiles. In such cases, the access point 306 may select a pre-loaded configuration profile, using the default group name, and configure itself with the provisioning information provided by this configuration profile.

The steps included in the process 600 may also be used to reconfigure the access point 306 at a later time. For example, when a change to the configuration for a specific group is to be made, the configuration profile for the group may be changed at the controller 304. The controller 304 may thereafter broadcast messages to the network, such as PAPI messages, that indicate the configuration change. These messages may include the group name. Access points that belong to that group may recognize that the messages are intended for their group, may accept the messages, and may use the message content to reconfigure themselves. Alternatively or additionally, the controller 304 may maintain lists of which access points are in which groups, and, instead of broadcasting messages, may direct messages to each specific access point that is a member of the group. Upon receipt of provisioning information, as at step 522, the access point may proceed to reconfigure itself.

Changing an access point's group name may also be facilitated by the steps included by the process 600. For example, the controller 304 may transmit a message, such as a PAPI message, to the access point 306. This message may include the access point's 306 new group name. Receipt of this message may cause the access point 306 to automatically request provisioning information, as at step 616. Alternatively or additionally, the controller 304 may transmit provisioning information to the access point 306, as at step 620. This provisioning information may include the new group name. Upon receipt of provisioning information, as at step 622, the access point may proceed to reconfigure itself.

IV. Automated Provisioning of Access Points with a Multi-Port Network Infrastructure Device As noted above, the system 300 of FIG. 3 can, in various embodiments, be used to provision any number of access points in an automated fashion. The process for automatically provisioning access points may include receiving, by a multi-port network infrastructure device 308, a message from an un-provisioned access point 306. The message from the access point may include information about the access point, such as the access point's IP address. The multi-port network infrastructure device 308 may further determine a port to which the access point is connected. The multi-port network infrastructure device's 308 ports may be assigned to one or more access point groups. The port to which the access point 306 is connected may therefore determine the access point group to which the access point 306 is to belong. The identified access point group provides a group name for the access point 306. The multi-port network infrastructure device 308 may send a message to the access point 306 that includes this group name. The access point 306 may subsequently use this group name to acquire provisioning information, and configure itself with this provisioning information.

Figure 7A:
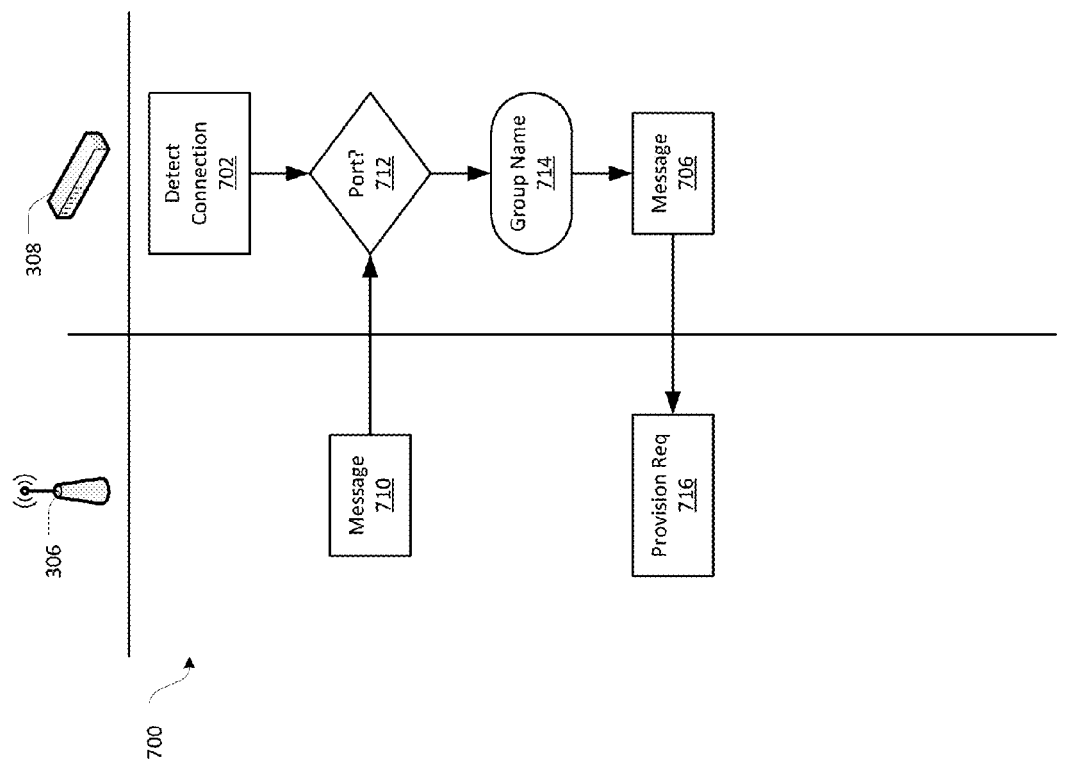
FIGS. 7A-7B illustrate examples of processes for automated bulk provisioning of access points using a multi-port network infrastructure device.

FIG. 7A illustrates one example of a process 700 for automated bulk provisioning of access points. In the illustrated process 700, an access point 306 may interact with a multi-port network infrastructure device 308, both of which are described with respect to FIG. 3. The steps of the process 700 of FIG. 7A occur automatically when the multi-port network infrastructure device 308 detects a connection to an access point 306, and do not require prompting from a human network administrator. In some cases, however, the process 700 may be facilitated by actions taken by a network administrator. For example, in a large installation of new access points, bulk (or any) provisioning may be suspended until all access points are installed or the network administrator otherwise indicates that provisioning should occur. The steps of the process 700 are described as applying to one multi-port network infrastructure device 308; however, the same process 400 can be applied to any or all multi-port network infrastructure devices in the network, and for any or all access points connected to those multi-port network infrastructure devices either sequentially, approximately at the same time, or in some combination thereof.

In FIG. 7A, at step 702, the multi-port network infrastructure device 308 may detect a connection to an access point 306. The multi-port network infrastructure device 308 may detect the connection when the access point 306 is physically connected to the multi-port network infrastructure device 308, for example with a cable plugged into one of the multi-port network infrastructure device's 308 ports. Alternatively, the multi-port network infrastructure device 308 may detect a wireless connection to an access point 306. Alternatively or additionally, the multi-port network infrastructure device 308 may be informed by an external source that the access point 306 has connected to a port on the multi-port network infrastructure device 308. For example, a network administrator may inform the multi-port network infrastructure device 308 that it has a new connection. After detecting the connection to the access point 306, the multi-port network infrastructure device 308 may make network resources available to the access point 306. For example, the multi-port network infrastructure device 308 may begin accepting packets from the access point 306, and forwarding these packets on to other ports.

Packets received from the access point 306 may include packets that are intended for, or may be read by, the multi-port network infrastructure device 308. At step 710, the access point 306 may transmit a packet that includes a message intended for at least the multi-port network infrastructure device 308. For example, the access point 306 may transmit a Link Layer Discovery Protocol (LLDP) message. An LLDP message from the access point 306 may contain information such as, for example, the access point's 306 IP address, a system name and description, a port name and description, a virtual local area network (VLAN) name, and an IP management address, system capabilities (switching, routing, etc.), Media Access Control (MAC) and/or physical (PHY) information, power information, and/or link aggregation (methods of combining multiple network connections in parallel in order to increase throughput beyond what a single connection could sustain) information. An LLDP message may also include any amount of optional information. LLDP messages may be broadcast by the access point 306 and/or the multi-port network infrastructure device 308, so that the access point's 306 information may be distributed to other parts of the network.

At step 712, the multi-port network infrastructure device 308 may identify the port to which the access point 306 is connected. The multi-port network infrastructure device 308 may use information obtained from an LLDP message from the access point 306. Alternatively or additionally, the multi-port network infrastructure device 308 may detect that the access point 306 is connected to one of its ports. For example, the multi-port network infrastructure device 308 may detect power or communication signals on that port.

At step 714, the multi-port network infrastructure device 308 may use the port identified in step 712 to identify an access point group name. The multi-port network infrastructure device 308 may be configured such that each of its ports is assigned to a different access point group. Alternatively or additionally, a range of ports may be assigned to an access point group. For example, ports 1-5 may be assigned to the group "work_area", ports 6-10 may be assigned to the group "conference_rooms", and ports 10-15 may be assigned to the group "auditorium." Alternatively or additionally, discontinuous ports (e.g., all odd or all even port numbers, or every third port, etc.) may be assigned to an access point group. Alternatively, all of the multi-port network infrastructure device's 308 ports may be assigned to the same access point group.

At step 706, multi-port network infrastructure device 308 may communicate the identified group name to the access point 306. For example, the multi-port network infrastructure device 308 may transmit an LLDP message to the access point 306. An LLDP message is typically composed of a series of type-length-value (TLV) structures. A TLV may include a type, indicating the type of the data stored in the TLV. A TLV may also include a length, indicating the length of a value stored in the TLV. A TLV may optionally also include a value. An LLDP may include mandatory TLVs, such as a chassis identifier, a port identifier, and/or a time-to-live identifier. LLDP messages may also include any number of optional TLVs. An optional TLV may be used to transmit the access point's 306 group name to the access point 306. For example, an LLDP may include a TLV of type 127 (commonly used for custom TLVs) and an alphanumeric value that includes the group name (each character possibly encoded in an 8-bit value).

A multi-port network infrastructure device may be configured with one or more access point group profiles. A profile may be assigned to one or more of the multi-port network infrastructure device's 308 ports. Table 3 and Table 4 illustrate two examples of profiles that may be assigned to a port. The "LLDP Protocol Data Unit (PDU) transmit" parameter indicates whether an LLDP to the access point 306 should be transmitted. The "AP_Group TLV" (Access Point Group TLV) parameter indicates whether the LLDP to the access point 306 should include an access point group name. The "AP_Group Name" (Access Point Group Name) parameter gives the name of the access point group provided by the profile.

TABLE 3

LLDP Profile "device-group-work"

| Parameter | Value |
| --- | --- |
| LLDP PDU transmit | Enabled |
| AP_Group TLV | Enabled |
| AP_Group Name | work_area |

TABLE 4

LLDP Profile "device-group-conf"

| Parameter | Value |
| --- | --- |
| LLDP PDU transmit | Enabled |
| AP_Group TLV | Enabled |
| AP_Group Name | conference_rooms |

At step 716, the access point 306 may receive the message from the multi-port network infrastructure device 308. The access point 306 may use the group name communicated in the message transmitted at step 706 to obtain provisioning information. For example, the access point 306 may contact the controller 304, and provide the controller 304 the access point's 306 group name. The controller 304 may be configured with configuration profiles for each designated access point group at the deployment site. Each configuration profile contains the provisioning information for a named group. The controller 304 may use the group name provided by the provisioning request to select the provisioning information that is suitable for the access point 306. Alternatively, the controller 304 may select default provisioning information. For example, the controller 304 may provide default provisioning information when the controller 304 does not recognize the group name provided with the provisioning request. The access point 306 may receive the appropriate provisioning information from the controller 304. The access point 306 may thereafter configure its operations. Configuring the access point's 306 operations may include automatically applying the configuration settings provided by the provisioning information. Thereafter, the access point 306 may be ready to supply wireless services to client devices.

Figure 7B:
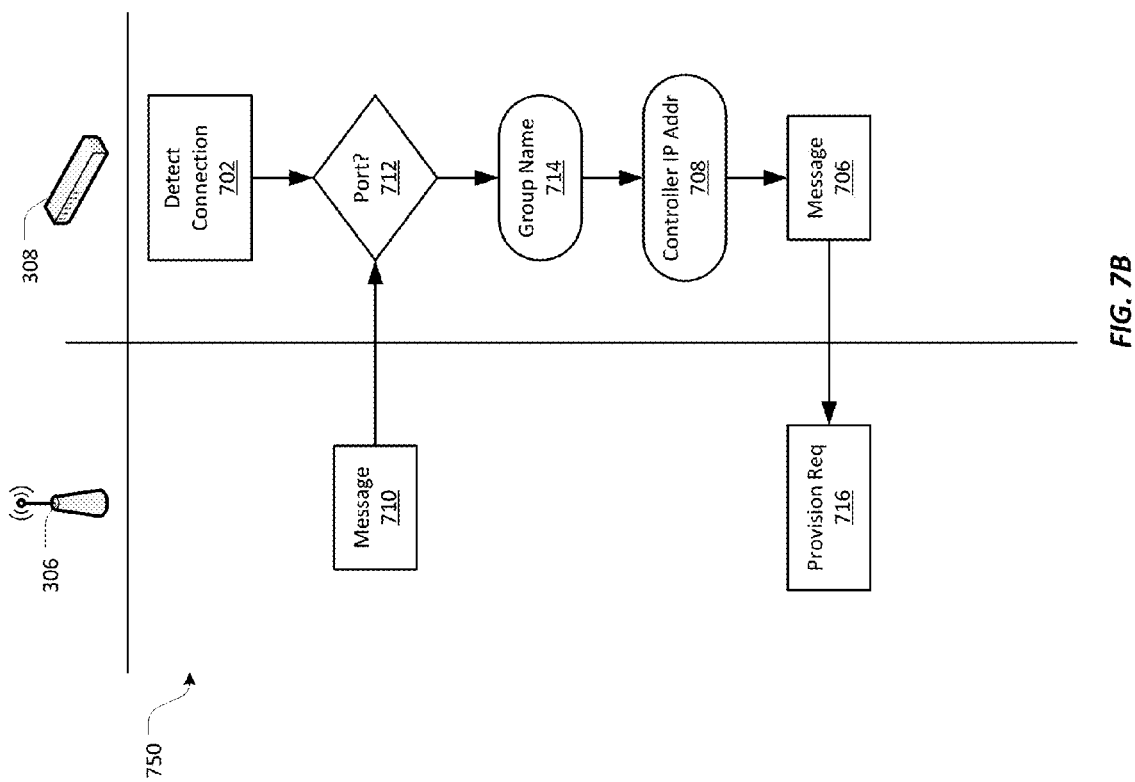

FIG. 7B illustrates an alternate example of a process 750 for automated bulk provisioning of access points. This process 750 may also involve interaction between an access point 306 and a multi-port network infrastructure device 308. The process 750 includes steps similar to those in the process 700 of FIG. 7A, as indicated by the figure numbers.

In FIG. 7B, at step 702, the multi-port network infrastructure device 308 may detect a connection to an access point 306. After detecting the connection to the access point 306, the multi-port network infrastructure device 308 may make network resources available to the access point 306. For example, the multi-port network infrastructure device 308 may begin accepting packets from the access point 306, and forwarding these packets on to other ports.

At step 710, the access point 306 may transmit a packet that includes a message intended for at least the multi-port network infrastructure device 308. For example, the access point 306 may transmit an LLDP message. An LLDP message from the access point 306 may contain information such as, for example, the access point's 306 IP address. An LLDP message may also include any amount of optional information.

At step 712, the multi-port network infrastructure device 308 may identify the port to which the access point 306 is connected. At step 714, the multi-port network infrastructure device 308 may use the port identified in step 712 to identify an access point group name.

The multi-port network infrastructure device 308 may also be configured to provide an IP address of the controller 304 to the access point 306. For example, the LLDP profiles of Table 3 and Table 4 may include the controller 304 IP address. At step 708, the multi-port network infrastructure device 308 may extract the controller 304 IP address from its configuration. The controller 304 IP address may be provided to step 706.

At step 706, multi-port network infrastructure device 308 may communicate the identified group name to the access point 306. For example, the multi-port network infrastructure device 308 may transmit an LLDP message to the access point 306, where an optional TLV in the LLDP message includes the group name. The multi-port network infrastructure device 308 may also communicate the controller 304 IP address to the access point 306. For example, the LLDP message to the access point 306 may also include an optional TLV that includes the controller 304 IP address.

At step 716, the access point 306 may receive the message from the multi-port network infrastructure device 308. The access point 306 may use the group name communicated in the message transmitted at step 706 to obtain provisioning information. For example, the access point 306 may contact the controller 304, and provide the controller 304 the access point's group 306 name. The access point 306 may use the controller 304 IP address transmitted by the multi-port network infrastructure device at step 706 to contact the controller 304. For example, the access point 306 may address a provisioning request to the controller 304, using the controller 304 IP address. The access point 306 may subsequently receive the appropriate provisioning information from the controller 304. The access point 306 may thereafter configure its operations, and may be ready to supply wireless services to client devices.

The steps included in the processes 700, 750 of FIGS. 7A and 7B may also be used to reconfigure the access point 306 at a later time. For example, it may be determined that the access point group to which the access point 306 belongs requires a configuration change. A message may be transmitted to the multi-port network infrastructure device 308 to inform the multi-port network infrastructure device 308 that a configuration change is being initiated. In some implementations, this message may come for a controller, such as the controller 304, that is responsible for managing the access point 306. The message initiating the configuration change may come in the form of, for example, an LLDP message, and TLV in the LLDP may indicate that the multi-port network infrastructure device 308 is to notify the access point 306 of the configuration change. Upon receipt of this message, the multi-port network infrastructure device 308 may transmit a message, such as at step 706, to inform some or all of the access points connected to it, such as the access point 306, that the access points should re-acquire provisioning information. The message transmitted to the access point 306 may, for example, be in the form of an LLDP message. Receipt of this message may cause the access point 306 to request provisioning information, such as at step 716. Upon receipt of this new provisioning information, the access point 306 may re-configure itself.

The multi-port network infrastructure device 308 may further notify any other access points that belong to the same group as the access point 306 of the configuration change.

Changing an access point's group name may also be facilitated by steps included in the processes 700, 750. For example, a message may be transmitted to the multi-port network infrastructure device 308 to configure the multi-port network infrastructure device 308 with the new group name. In some implementations, this message may come from a controller, such as the controller 304, that is responsible for managing the access point 306. As discussed above, the multi-port network infrastructure device's 308 ports may be variously assigned to different access point groups. The message with the new group name may change configuration of the port to which the access point 306 is attached. Upon receipt of this message, the multi-port network infrastructure device 308 may transmit a message, such as for example an LLDP message, to the access point 306, such as at step 706. Receipt of this message may provide the access point 306 with its new group name. Receipt of this message may also cause the access point 306 to request provisioning information, such as at step 716. Upon receipt of this new provisioning information, the access point 306 may re-configure itself. The multi-port network infrastructure device 308 may further notify any other access points that belong to the same group as the access point 306 of the new group name.

V. Automated Provisioning of Access Points with a DHCP Server

As noted above, the system 300 of FIG. 3 can, in various embodiments, be used to provision any number of access points in an automated fashion. The process for automatically provisioning access points may include receiving, by a DHCP server 316, a DHCP request from an un-provisioned access point 306. The DHCP request may be a request for an IP address. The DHCP server 316 may determine an IP address to assign to the access point 306. The DHCP server 316 may also determine to which access point group the access point 306 should belong. The DHCP server 316 may make this determination using the IP address that is to be assigned to the access point 306. The access point group may provide a group name. The DHCP server 316 may include the group name in a DHCP response to the access point 306. The DHCP response may also include the access point's 306 IP address, and other information. The access point 306 may subsequently use this group name to acquire provisioning information, and configure itself with this provisioning information.

Figure 8A:
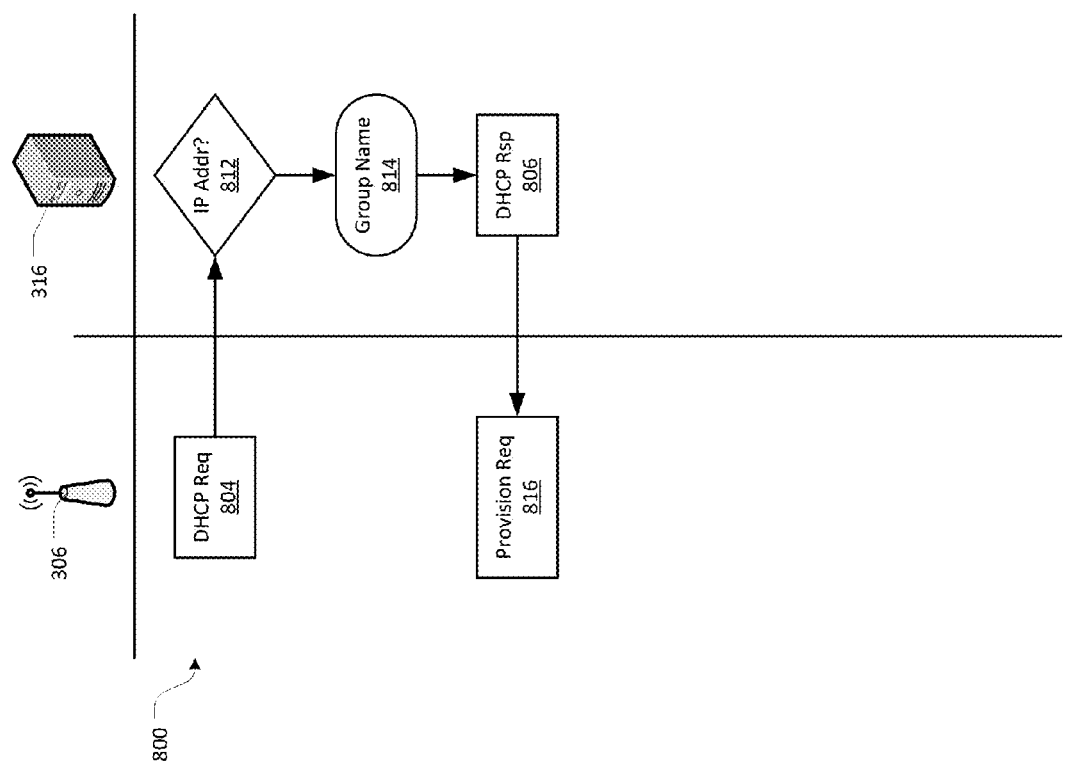
FIGS. 8A-8B illustrate examples of processes for automated bulk provisioning of access points using a DHCP server.

FIG. 8A illustrates one example of a process 800 for automated bulk provisioning of access points. In the illustrated process 800, an access point 306 may interact with a DHCP server 316, both of which are described with respect to FIG. 3. The steps of the process 800 of FIG. 8A occur automatically when the DHCP server 316 receives a DHCP request from the access point 306, and do not require prompting from a human network administrator. In some cases, however, the process 800 may be facilitated by actions taken by a network administrator. The steps of the process 800 are described as applying to one access point 306; however, the same process 800 can be applied to any or all DHCP servers connected to the network, and any or all access points that may communicate with those DHCP servers.

In FIG. 8A, at step 804, the access point 306 may transmit a DHCP request. The access point may transmit the DHCP request in order to obtain an IP address. An IP address is one of several ways in which the access point 306 identifies itself to the network. An IP address allows the access point 306 to communicate with the network, and further allows devices in the network to communicate with the access point 306. The DHCP request may be broadcast to the network, with the expectation that the DHCP server 316 will receive the DHCP request.

At step 812, the DHCP server 316 may receive the DHCP request from the access point 306. The DHCP server may then determine an IP address to assign to the access point. As noted above, the DHCP server 316 may be responsible for managing and assigning IP addresses in a network. A subset of these addresses may be set aside for access points. The DHCP server 316 may select an IP address for the access point 306 based on a number of factors, such as where the access point 306 is physically located, the access point's physical connection to the network, and/or any parameters sent by the access point 306 in its DHCP request.

Having determined the IP address that is to be assigned to the access point 306, the DHCP server 316 may, at step 814, determine the access point's 306 group name, using the assigned IP address. The DHCP server 316 may be configured such that each IP address that it may assign to an access point is designated as belonging to a different group. Alternatively or additionally, the DHCP server 316 may be configured such that ranges of IP addresses are assigned to different groups. For example, the IP address range 10.1.1.100 through 10.1.1.150 (fifty addresses) may be assigned to the group "work_area" while the address range 10.1.1.151 through 10.1.1.200 may be assigned to the group "conference_rooms." Alternatively or additionally, all the IP addresses in a subnet may be assigned to a group. Subnets group together a number of logically related devices, and allow them to present a single IP address to other networks and devices. This allows routers to route packets intended for any device within the subnet to the same IP address (typically the IP address of an interface of a router or other subnet device assigned to that subnet) without needing to determine the exact address of the intended device. Once a packet reaches the subnet device to which the IP address has been assigned, the subnet device uses other address information to determine the address of the intended device.

At step 806, the DHCP server 316 may generate a DHCP response. The DHCP response may include the group name identified at step 814. The DHCP response may also include the IP address for the access point 306. The DHCP response may also include other information that may be used by the access point 306. The group name may be provided in an optional field in the DHCP response. Optional fields, or "options," may be used by the DHCP server 316 to transmit optional configuration parameters. DHCP options have assigned numbers and names, but some options may be used according to how the DHCP server 316 is configured. For example, the group name may be placed in option 43, which is designated for Vendor Specific Information. Alternatively or additionally, the group name may be placed in option 60, which is designated as the Vendor Class Identifier. The group name may alternatively or additionally be placed in other options, including optional and extension options. Vendor-related options, however, are designated for use by a vendor, and placing information such as the controller 304 IP address in these options is least likely to affect interoperability with other network devices.

An example of a DHCP server configuration using options 43 and 60 is provided below. The DHCP server 316 may use this example configuration when generating a response to the DHCP request from the access point 306. Furthermore, this configuration would not be applied when the DHCP server 316 responds to DHCP requests from devices that are not access points.

```
option masterip code 43 = ip-address;
option vendor-class-identifier code 60 = string;
group {
    option masterip 10.1.1.245;
    option vendor-class-identifier "ArubaAP;APGroupName1";
    subnet 20.1.1.0 netmask 255.255.255.0 {
        range 10.1.1.100 10.1.1.150;
        option subnet-mask 255.255.255.0;
        option broadcast-address 10.1.1.255;
        option routers 10.1.1.245;}
}
```

At step 816, the access point 306 may receive the DHCP response from the DHCP server 316. The access point 305 may use the group name communicated in the DHCP response transmitted at step 806 to obtain provisioning information. For example, the access point 306 may contact the controller 304, and provide the controller 304 its group name. The controller 304 may be configured with configuration profiles for each access point group at the deployment site. Each configuration profile contains the provisioning information for a named group. The controller 304 may use the group name provided by the provisioning request to select the provisioning information that is suitable for the access point 306. Alternatively, the controller 304 may select default provisioning information. For example, the controller 304 may provide default provisioning information when the controller 304 does not recognize the group name provided with the provisioning request. The access point 306 may receive the appropriate provisioning information from the controller 304. The access point 306 may thereafter configure its operations. Configuring the access point's 306 operations may include automatically applying the configuration settings provided by the provisioning information. Thereafter, the access point 306 may be ready to supply wireless services to client devices.

Figure 8B:
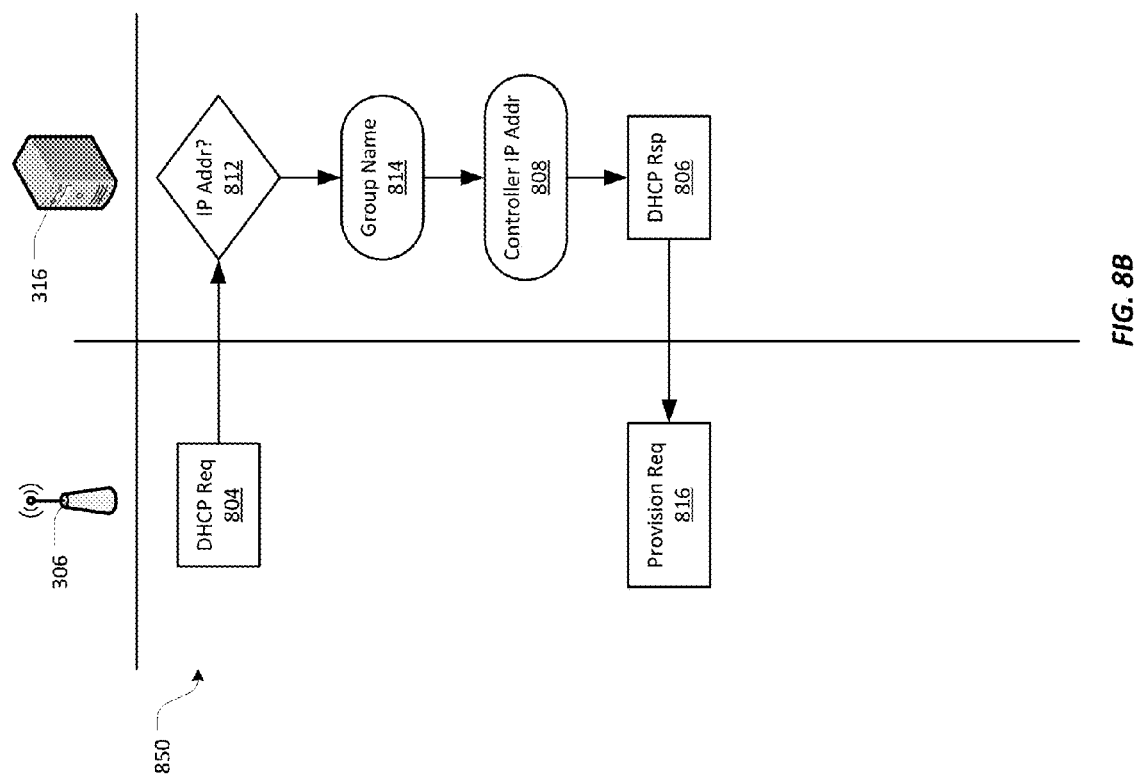

FIG. 8B illustrates an alternate example of a process 850 for automated bulk provisioning of access points. This process 850 may also involve interaction between an access point 306 and a DHCP server 316. The process 850 includes steps similar to those in the process 800 of FIG. 8A, as is indicated by the figure numbers.

In FIG. 8B, at step 804, the access point 306 may transmit a DHCP request to obtain an IP address. At step 812, the DHCP server 316 may receive the DHCP request from the access point 306. The DHCP server may then determine an IP address to assign to the access point. Having determined the IP address that is to be assigned to the access point 306, the DHCP server 316 may, at step 814, determine the access point's 306 group name, using the assigned IP address.

At step 808, the DHCP server 316 may also be configured to provide an IP address for the controller 304. In some implementations, the DHCP server 316 may be configured to identify DHCP requests from access points, and may further be configured to include the controller 304 IP address in a response to DHCP requests from an access point. The DHCP server 316 may further be configured to provide the controller 304 IP address only to access points. In other implementations, the DHCP server 316 may be configured to provide the controller 304 IP address in response to any DHCP request. In yet other implementations, the DHCP server 316 may be configured to provide the controller 304 IP address only for certain IP addresses, such as IP addresses selected at step 812.

At step 806, the DHCP server 316 may generate a DHCP response. The DHCP response may include the group name identified at step 814. The DHCP response may also include the controller 304 IP address from step 808. The DHCP response may also include other information, such as the IP address for the access point 306. The group name and/or controller 304 IP address may be provided in optional fields in the DHCP response. For example, the group name and/or controller 304 IP address may be placed in option 43, which is designated for Vendor Specific Information. Alternatively or additionally, the group name may be placed in option 60, which is designated as the Vendor Class Identifier. The group name may alternatively or additionally be placed in other options, including optional and extension options.

At step 816, the access point 306 may receive the DHCP response from the DHCP server 316. The access point 305 may use the group name communicated in the DHCP response transmitted at step 806 to obtain provisioning information. For example, the access point 306 may contact the controller 304, and provide the controller 304 its group name. The access point 306 may use the controller 304 IP address transmitted by the DHCP server 316 at step 806 to contact the controller 304. For example, the access point 306 may address a provisioning request to the controller 304, using the controller 304 IP address. The access point 306 may subsequently receive the appropriate provisioning information from the controller 304. The access point 306 may thereafter configure its operations, and may be ready to supply wireless services to client devices.

The steps included in the processes 800, 850 of FIGS. 8A and 8B may also be used to reconfigure the access point 306 at a later time. For example, it may be determined that the access point group to which the access point 306 belongs requires a configuration change. A message may be transmitted to the DHCP server 316 to inform the DHCP server 316 that a configuration change is being initiated. In some implementations, this message may come for a controller, such as the controller 304, that is responsible for managing the access point 306. The message initiating the configuration change may come in the form of, for example, an LLDP message, and TLV in the LLDP may indicate that the DHCP server 316 is to inform the access point 306 of the configuration change. Upon receipt of this message, the DHCP server 316 may transmit a DHCP response to the access point 306, such as at step 806. This DHCP response may, for example, include information in an option that indicates to the access point 306 that the access point 306 should re-request provisioning information. Receipt of this message may thus cause the access point 306 to request provisioning information, such as at step 816. Upon receipt of this new provisioning information, the access point 306 may re-configure itself. The DHCP server 316 may further notify any other access points that belong to the same group as the access point 306 of the configuration change.

Changing an access point's group name may also be facilitated by the steps included in the processes 800, 850. For example, a message may be transmitted to the DHCP server 316 to configure the DHCP server 316 with the new group name. In some implementations, this message may come for a controller, such as the controller 304, that is responsible for managing the access point 306. As discussed above, the DHCP server 316 may be configured such that various IP addresses under management by the DHCP server 316 are assigned to different access point groups. The message with the new group name may therefore change the assignment of IP addresses to access point groups. Upon receipt of this message, the DHCP server 316 may transmit a DHCP response to the access point, such as at step 806. Receipt of this message may provide the access point 306 with its new group name. Receipt of this message may also cause the access point 306 to request provisioning information, such as at step 716. Upon receipt of this new provisioning information, the access point 306 may re-configure itself. The DHCP server 316 may further notify any other access points that belong to the same group as the access point 306 of the new group name.

VI. Automated Provisioning of Access Points with a Controller

As noted above, the system 300 of FIG. 3 can, in various embodiments, be used to provision any number of access points in an automated fashion. The process for automatically provisioning access points may include receiving, by a controller 304, a provisioning request from an un-provisioned access point 306. The provisioning request may include the group name of the access point 306. The provisioning request may also include the IP address of the access point 306. The controller 304 may determine the appropriate provisioning information for the access point 306, based on either the access point's 306 group name, IP address, or both. Alternatively, the controller 304 may determine the appropriate provisioning information for the access point 306 based on information about the access point provided by the provisioning request. The provisioning request may contain information about the access point such as configurations or protocols supported by the access point, versions or model numbers, and the like. The controller 304 may then transmit the provisioning information to the access point 306. The access point 306 may use the provisioning information to configure itself, and begin providing network services to client devices.

FIG. 9A illustrates one example of a process 900 for automated bulk provisioning of access points. In the illustrated process 900, an access point 306 may interact with a controller 304, both of which are described with respect to FIG. 3. The steps of the process 900 of FIG. 9A occur automatically when the controller 304 receives a provisioning request from the access point 306, and do not require prompting from a human network administrator. In some cases, however, the process 900 may be facilitated by actions taken by a network administrator. The steps of the process 900 are described as applying to one access point 306; however, the same process 900 can be applied to any or all access points connected to the network.

In FIG. 9A, at step 916, the access point 306 may transmit a provisioning request. In some implementations, the provisioning request may be in the form a Universal Datagram Protocol (UDP) type message. For example, the access point 306 may transmit a Process Application Protocol Interface (PAPI) message. PAPI is a proprietary protocol used by Aruba Networks, Inc. for communication between access points and controllers PAPI uses UDP port 8211. Use of this specific protocol is not necessary, and access points and/or controllers may also use other standardized or proprietary protocols for communications between them. The provisioning request may include information about the access point 306, such as the access point's 306 IP address and/or group name. In some implementations, the provisioning request is not specifically a request for provisioning. In these implementations, the provisioning request may be a message that indicates that the access point 306 is un-provisioned, and/or a message that indicates that the access point 306 is incorrectly provisioned.

At step 918, the controller 304 may receive the provisioning request from the access point 306. As noted above, the provisioning request may include the access point's 306 group name. The controller 304 may be configured with configuration profiles for each of the access point groups at the deployment site. Each configuration profile contains the provisioning information for a named group. The controller 304 may use the group name provided by the provisioning request to select the provisioning information that is suitable for the access point 306. Alternatively, the controller 304 may select default provisioning information. For example, the controller 304 may provide default provisioning information when the controller 304 does not recognize the group name provided with the provisioning request.

At step 920, the controller 304 may transmit the selected provisioning information to the access point 306. The controller 304 may, for example, send a UDP type message, such as a PAPI message, containing the provisioning information. Alternatively or additionally, the controller 304 may transmit a series of messages, each containing a portion of the provisioning information.

At step 922 the access point 306 may receive the provisioning information from the controller 304. Upon receiving the provisioning information, the access point 306 may configure its operations. Configuring the access point's 306 operations may include automatically applying the configuration settings provided at step 922. The access point 306 may receive the provisioning information from the controller 304. Upon receiving the provisioning information, the access point 306 may configure its operations. Configuring the access point's 306 operations may include automatically applying the configuration settings provided by the provisioning information. Thereafter, the access point 306 may be ready to supply wireless services to client devices by the provisioning information. Thereafter, the access point 306 may be ready to supply wireless services to client devices.

Figure 9B:
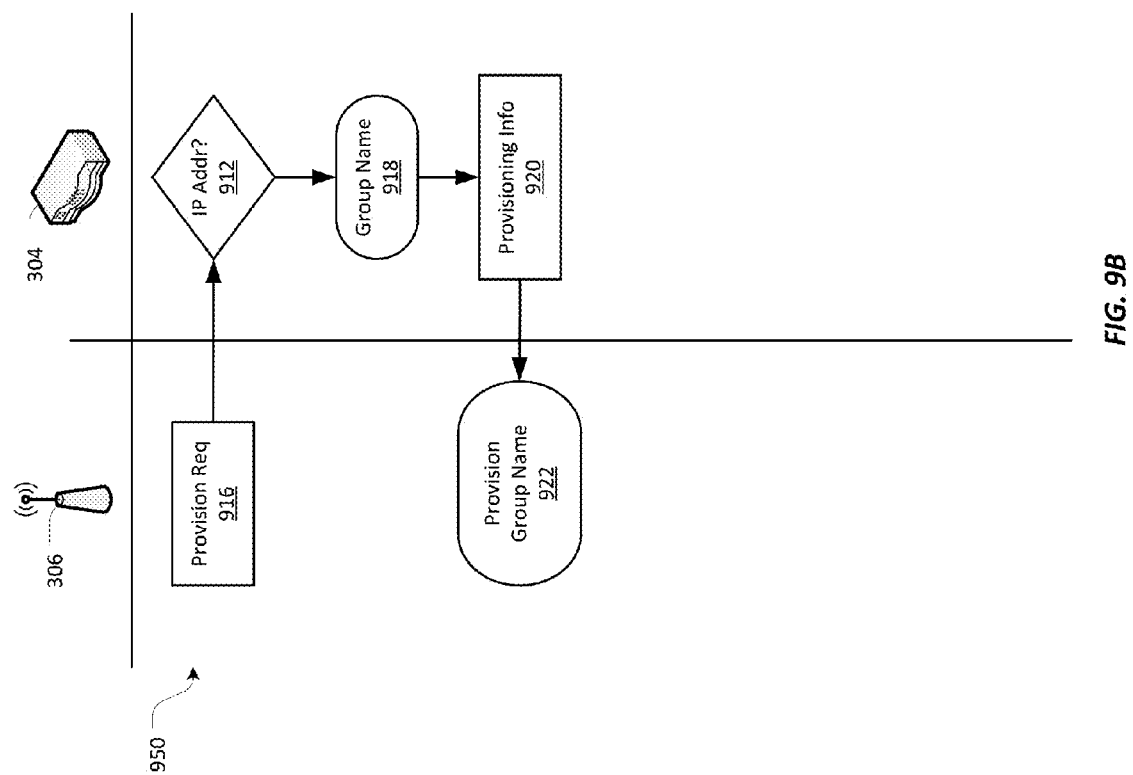

FIG. 9B illustrates an alternate example of a process 950 for automated bulk provisioning of access points. This process 950 may also involve interaction between an access point 306 and a controller 304. The process 950 includes steps similar to those in the process 900 of FIG. 9A, as indicated by the figure numbers.

In FIG. 9B, at step 916, the access point 306 may transmit a provisioning request. For example, the access point 306 may transmit a UDP-type message, such as a PAPI message. The provisioning request may include information about the access point 306, such as the access point's 306 IP address.

At step 912, the controller 304 may receive the provisioning request from the access point 306. The controller 304 may, at step 918, determine the access point's 306 group name, using the IP address provided with the provisioning request. The controller 304 may be configured to manage a number of IP addresses within the network. The controller 304 may further be configured such that each IP address that may be assigned to an access point is designated as belonging to a certain access point group. For example, each IP address designated for access points may be assigned to a different access point group. Alternatively or additionally, the controller 304 may be configured such that ranges of IP addresses are assigned to different groups. For example, the IP address range 172.168.24.25 through 172.168.56.250 may be assigned to the group "work_area" while the IP address range 1.1.24.25 through 1.1.25.250 may be assigned to the group "conference_rooms". This example may be provided to the controller 304 as the following example parameters.

```
#provision-ap range 172.168.24.25 to 172.168.56.250 ap-group
  WORK_AREA
#provision-ap range 1.1.24.25 to 1.1.25.250 ap-group
  CONFERENCE_ROOMS
```

Alternatively or additionally, all the IP addresses in a subnet may be assigned to a group.

The controller 304 may be configured with configuration profiles for each access point group at the deployment site. Each configuration profile contains the provisioning information for a named group. The controller 304 may use the group name determined at step 918 to select the provisioning information that is suitable for the access point 306. At step 920, the controller 304 may transmit the provisioning information to the access point 306. The controller 304 may, for example, send a UDP type message, such as a PAPI message, containing the provisioning information. Alternatively or additionally, the controller 304 may transmit a series of messages, each containing a portion of the provisioning information.

At step 922, the access point 306 may receive the provisioning information from the controller 304. Upon receiving the provisioning information, the access point 306 may configure its operations. Configuring the access point's 306 operations may include automatically applying the configuration settings provided by the provisioning information. Thereafter, the access point 306 may be ready to supply wireless services to client devices.

The steps included in the processes 900, 950 of FIGS. 9A and 9B may also be used to reconfigure the access point 306 at a later time. For example, it may be determined that the access point group to which the access point 306 belongs requires a configuration change. The controller 304 may be reconfigured to reflect this change. For example, a configuration profile for the access point group, stored by the controller 304, may be updated with the new configuration settings. Receipt of this new configuration, and/or a command from a network administrator, may cause the controller 304 to transmit the updated provisioning information to the access point 306, such as at step 920. Upon receipt of this new provisioning information, the access point 306 may re-configure itself. The controller 304 may further provide any other access points that are in the same group as the access point 306 with the new provisioning information.

Changing an access point's group name may also be facilitated by the steps included in the processes 900, 950. For example, the controller 304 may be reconfigured with the new group name. For example, a configuration profile for the access point group, stored by the controller 304, may be updated with the new group name. Receipt of the new group name, and/or a command from a network administrator, may cause the controller 304 to transmit the updated provisioning information to the access point 306, such as at step 920. Upon receipt of this new provisioning information, the access point 306 may re-configure itself. The controller 304 may further provide any other access points that are in the same group as the access point 306 with the new provisioning information.

VII. Network Device

Figure 10:
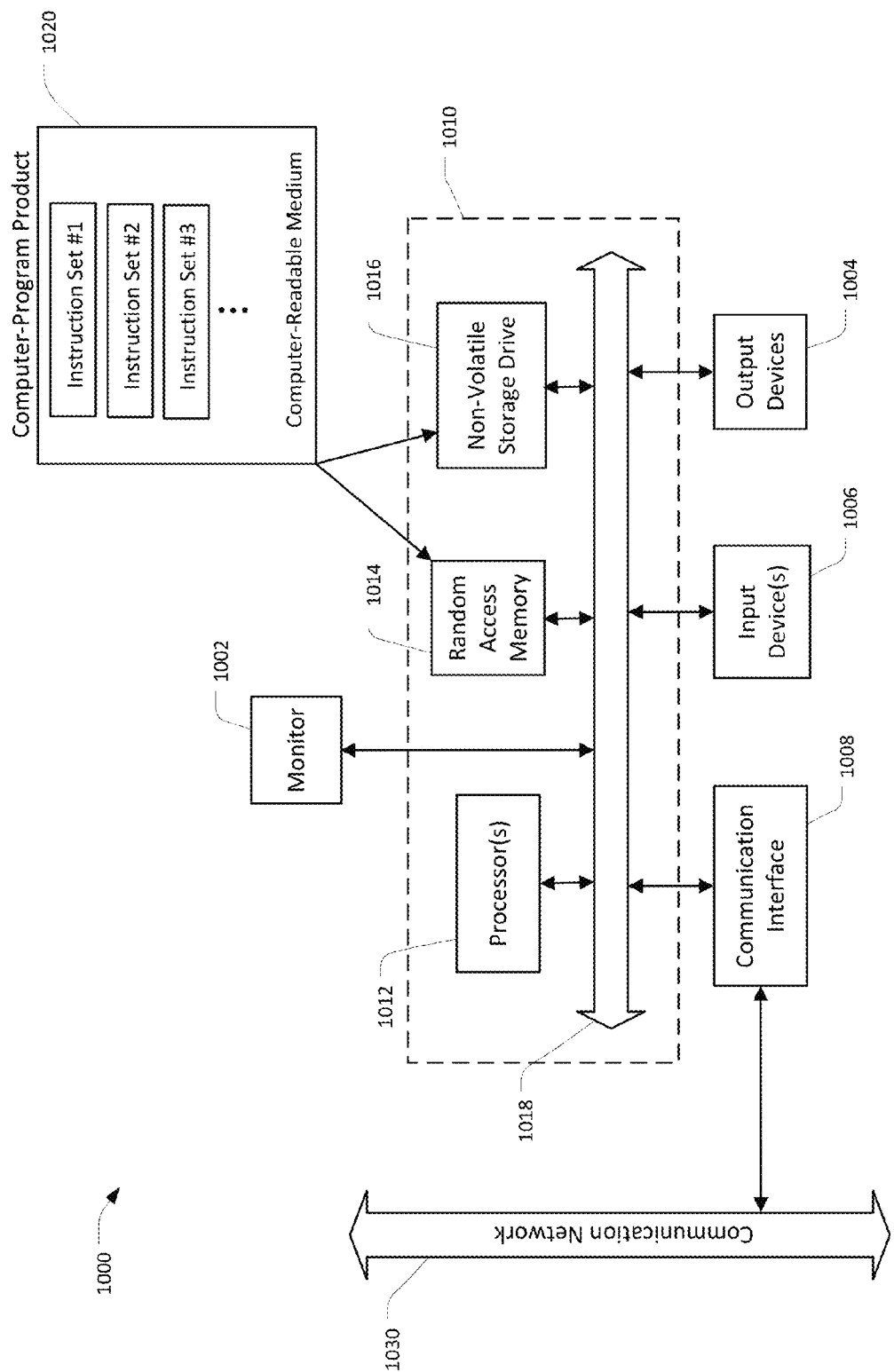
FIG. 10 illustrates an embodiment of a network device.

FIG. 10 illustrates an embodiment of a network device 1000. The above methods may be implemented by computer-program products that direct a network device to perform the actions of the above-described methods and components. Each such computer-program product may comprise sets of instructions (code or program code) embodied on a computer-readable medium that directs the processor of a computer system to perform corresponding actions. The instructions may be configured to run in sequential order, or in parallel (such as under different processing threads), or in a combination thereof.

The network device 1000 comprises a processing system 1010, an optional monitor 1002 coupled to the processing system 1010, one or more optional user output devices 1004 coupled to the processing system 1010, one or more optional user input devices 1006 (e.g., keyboard, mouse, track ball, touch screen) coupled to the processing system 1010, an optional communications interface 1008 coupled to the processing system 1010, a computer-program product 1020 stored in a tangible computer-readable memory in the processing system 1010. The computer-program product 1020 directs the network device 1000 to perform the above-described methods. The processing system 1010 may include one or more processors 1012 that communicate with a number of peripheral devices via a bus subsystem 1018. These peripheral devices may include the user output device(s) 1004, user input device(s) 1006, communications interface 1008, and a storage subsystem, such as a random access memory (RAM) 1014 and/or a non-volatile storage drive 1016 (e.g., disk drive, optical drive, solid state drive), which are forms of tangible computer-readable memory.

The computer-program product 1020 may be stored in the non-volatile storage drive 1016 and/or another computer-readable medium accessible to the processing system 1010 and loaded into the memory 1014. Each processor 1012 may comprise a microprocessor, such as a microprocessor from Intel® or Advanced Micro Devices, Inc.®, or the like. To support the computer-program product 1020, the processing system 1010 runs an operating system that handles the communications of the computer-program product 1020 with the above-noted components, as well as the communications between the above-noted components in support of the computer-program product 1020. Exemplary operating systems include ArubaOS from Aruba Networks, Windows® or the like from Microsoft Corporation, Solaris® from Sun Microsystems, LINUX, UNIX, and the like, and/or device- or system-specific operating systems and the like.

The user input devices 1006 may include a keyboard, a keypad, a mouse, a scanner, a digital drawing pad, a touch screen incorporated into the display, audio input devices such as voice recognition systems, microphones, and other types of input devices. In various embodiments, the user input devices 1006 are typically embodied as a computer mouse, a trackball, a track pad, a joystick, wireless remote, a drawing tablet, or a voice command system. The user input devices 1006 typically allow a user to select objects, icons, text and the like that appear on the monitor 1002 via a command such as a click of a button or the like. The user output devices 1004 include devices and mechanisms to output information from the processing system 1010. These may include a display (e.g., a monitor 1002), printers, non-visual displays such as audio output devices, etc.

The communications interface 1008 provides an interface to communication networks 1030 and devices and may serve as an interface to receive data from and transmit data to other systems, WANs and/or the Internet. Embodiments of the communications interface 1008 may be an Ethernet card, a modem, a cable modem, a router, a switch, an embedded multimedia adapter (EMTA), a synchronous or asynchronous digital subscriber line (DSL) unit, a FireWire® interface, a USB® interface, a wireless network adapter, and the like. For example, the communications interface 1008 may be coupled to a computer network, to a FireWire® bus, or the like. In other embodiments, the communications interface 1008 may be physically integrated on a board of the processing system 1010, and/or may be a software program, or the like.

The RAM 1014 and non-volatile storage drive 1016 are examples of tangible computer-readable media configured to store data such as computer-program product embodiments of the systems and methods described herein, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. The RAM 1014 and non-volatile storage drive 1016 may be configured to store the basic programming and data constructs that provide the functionality of various embodiments of the systems and methods described above.

Software instruction sets that provide the functionality of the described methods may be stored in the RAM 1014 and/or non-volatile storage drive 1016. These instruction sets or code may be executed by the processor(s) 1012. The RAM 1014 and/or non-volatile storage drive 1016 may also provide a repository to store data and data structures used in accordance with the disclosed systems and methods. The RAM 1014 and non-volatile storage drive 1016 may include a number of memories including a main random access memory (RAM) to store instructions and data during program execution and a read-only memory (ROM) in which fixed instructions are stored. The RAM 1014 and non-volatile storage drive 1016 may include a file storage subsystem providing persistent (non-volatile) storage of program and/or data files. The RAM 1014 and non-volatile storage drive 1016 may also include removable storage systems, such as removable flash memory.

The bus subsystem 1018 provides a mechanism to allow the various components and subsystems of the processing system 1010 to communicate with each other as intended. Although the bus subsystem 1018 is shown schematically as a single bus, alternative embodiments of the bus subsystem 1018 may implement multiple busses or communication paths within the processing system 1010.

The preceding description provides example embodiments only, and is not intended to limit the scope, applicability, or configuration of the disclosure. Rather, the preceding description of the example embodiments will provide those skilled in the art with an enabling description for implementing an example embodiment. It should be understood that various changes may be made in the function and arrangement of elements without departing from the spirit and scope of the systems and methods as set forth in the appended claims.

Specific details are given in the preceding description to provide a thorough understanding of the embodiments. It will be understood, however, by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive.

It is also noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the various systems and methods are described with reference to specific embodiments thereof, but those skilled in the art will recognize that the disclosed systems and methods are not limited thereto. Various features and aspects of the above-described systems and methods may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
connecting, by a network device, to a network, wherein connecting to the network includes automatically receiving a group name;
transmitting a dynamic host configuration protocol (DHCP) request message;
receiving a DHCP response message, wherein:
the DHCP response message provides an Internet Protocol (IP) address; and
the IP address facilitates communication by the network device with the network;
receiving controller information, wherein controller information includes a controller IP address;
requesting provisioning information, wherein the request includes the group name and the controller IP address;
receiving the provisioning information, wherein:
the provisioning information is associated with the controller IP address; and
the provisioning information allows self-configuration of the network device; and
configuring operation of the network device using the provisioning information associated with the controller IP address, wherein the group name is included in DHCP option 43 or in DHCP option 60.

2. The method of claim 1, wherein the DHCP response message includes the controller IP address.

3. The method of claim 2, wherein the controller IP address is included in DHCP option 43.

4. The method of claim 2, wherein the controller IP address is included in DHCP option 60.

5. The method of claim 1, wherein receiving the group name includes extracting the group name from the DHCP response message.

6. The method of claim 5, wherein the group name is based on the IP address provided by the DHCP response message.

7. The method of claim 1, wherein connecting to the network includes connecting to a port on a multi-port network infrastructure device.

8. The method of claim 7, wherein receiving the group name includes receiving a message from the multi-port network infrastructure device, wherein the message from the multi-port network infrastructure device includes the group name.

9. The method of claim 8, wherein the group name is based on an identity of the port.

10. The method of claim 8, wherein the message from the multi-port network infrastructure device comprises a link layer discovery protocol (LLDP) message with type-length-value (TLV) structures.

11. The method of claim 10, wherein a TLV includes the group name.

12. The method of claim 7, further comprising receiving a message from the multi-port network infrastructure device, wherein the message from the multi- port network infrastructure device includes the controller IP address.

13. The method of claim 12, wherein the message from the multi-port network infrastructure device comprises a link layer discovery protocol (LLDP) message with type-value-length (TLV) structures.

14. The method of claim 13, wherein a TLV includes the controller IP address.

15. The method of claim 7, wherein the multi-port network infrastructure device comprises a switch.

16. The method of claim 1, wherein the provisioning information includes radiofrequency settings.

17. The method of claim 1, wherein the provisioning information includes network identifiers.

18. The method of claim 1, further comprising receiving further configuration information, wherein the further configuration information is based on the group name.

19. A network device, comprising:
a processor; and
a non-transitory computer-readable medium containing instructions executable by the by the processor to:
connect to a network, wherein connecting to the network includes automatically receiving a group name;
transmit a dynamic host configuration protocol (DHCP) request message;
receive a DHCP response message, wherein:
the DHCP response message provides an Internet Protocol (IP) address; and
the IP address facilitates communication with the network;
receive controller information, wherein the controller information includes a controller IP address;
request provisioning information, wherein the request includes the group name and the controller IP address;
receive the provisioning information, wherein:
the provisioning information is associated with the controller IP address; and
the provisioning information allows self-configuration of the network device; and
configure operation of the network device using the provisioning information associated with the controller IP address, wherein the group name is included in DHCP option 43 or in DHCP option 60.

20. The network device of claim 19, wherein the DHCP response message includes the controller IP address.

21. The network device of claim 20, wherein the controller IP address is included in DHCP option 43.

22. The network device of claim 20, wherein the controller IP address is included in DHCP option 60.

23. The network device of claim 19, wherein the instructions to receive the group name include instructions executable to extract the group name from the DHCP response message.

24. The network device of claim 23, wherein the group name is based on the IP address provided by the DHCP response.

25. The network device of claim 19, wherein the instructions to connect to the network include instructions executable to connect to a port on a multi-port network infrastructure device.

26. The network device of claim 25, wherein the instructions to receive the group name include instructions executable to receive a message including the group name from the multi-port network infrastructure device.

27. The network device of claim 26, wherein the group name is based on an identity of the port.

28. The network device of claim 26, wherein the message from the multi-port network infrastructure device comprises a link layer discover protocol (LLDP) message with type-value-length (TLV) structures.

29. The network device of claim 28, wherein a TLV includes the group name.

30. The network device of claim 25, further comprising instructions executable by the processor to receive a message from the multi-port network infrastructure device, wherein the message includes the controller IP address.

31. The network device of claim 30, wherein the message from the multi-port network infrastructure device comprises a link layer discover protocol (LLDP) message with type-value-length (TLV) structures.

32. The network device of claim 31, wherein a TLV includes the controller IP address.

33. The network device of claim 25, wherein the multi-port network infrastructure device comprises a switch.

34. The network device of claim 19, wherein the provisioning information includes radiofrequency settings.

35. The network device of claim 19, wherein the provisioning information includes network identifiers.

36. The network device of claim 19, further comprising instructions executable by the processor to receive further configuration information, wherein the further configuration information is based on the group name.

37. A non-transitory machine-readable medium including instructions executable by a processor to:
connect to a network, wherein connecting includes automatically receiving a group name;
transmit a dynamic host configuration protocol (DHCP) request message;
receive a DHCP response message, wherein:
the DHCP response message provides an Internet Protocol (IP) address: and
the IP address facilitates communication with the network;
receive controller information, wherein the controller information includes a controller IP address request provisioning information, wherein the request includes the group name and the controller IP address;
receive the provisioning information, wherein:
the provisioning information is associated with the controller IP address; and
provisioning information allows self-configuration of the network device; and
configure operation of the network device using the provisioning information associated with the controller IP address, wherein the group name is included in DHCP option 43 or in DHCP option 60.

38. The non-transitory machine-readable medium of claim 37, wherein the DHCP response message includes the controller IP address.

39. The non-transitory machine-readable medium of claim 38, wherein the controller IP address is included in DHCP option 43.

40. The non-transitory machine-readable medium of claim 38, wherein the controller IP address is included in DHCP option 60.

41. The non-transitory machine-readable medium of claim 37, wherein receiving the group name includes extracting the group name from the DHCP response message.

42. The non-transitory machine-readable medium of claim 41, wherein the group name is based on the IP address provided by the DHCP response.

43. The non-transitory machine-readable medium of claim 37, wherein the instructions to connect to a network include instructions executable to connect to a port on a multi-port network infrastructure device.

44. The non-transitory machine-readable medium of claim 43, wherein the instructions to receive the group name include instructions executable to receive a message including the group name from the multi-port network infrastructure device.

45. The non-transitory machine-readable medium of claim 44, wherein the group name is based on an identity of the port.

46. The non-transitory machine-readable medium of claim 44, wherein the message from the multi-port network infrastructure device comprises a link layer discover protocol (LLDP) message with type-value-length (TLV) structures.

47. The non-transitory machine-readable medium of claim 46, wherein a TLV includes the group name.

48. The non-transitory machine-readable medium of claim 43, further comprising instructions executable by the processor to receive a message from the multi-port network infrastructure device, wherein the message includes the controller IP address.

49. The non-transitory machine-readable medium of claim 48, wherein the message from the multi-port network infrastructure device comprises a link layer discover protocol (LLDP) message with type-value-length (TLV) structures.

50. The non-transitory machine-readable medium of claim 49, wherein a TLV includes the controller IP address.

51. The non-transitory machine-readable medium of claim 43, wherein the multi-port network infrastructure device comprises a switch.

52. The non-transitory machine-readable medium of claim 37, wherein the provisioning information includes radiofrequency settings.

53. The non-transitory machine readable medium of claim 37, wherein the provisioning information includes network identifiers.

54. the non-transitory machine-readable medium of claim 37, further comprising instructions executable by the processor to receive further configuration information, wherein the further configuration information is based on the group name.

55. A method, comprising:
connecting, by a network device, to a network;
transmitting a dynamic host configuration protocol (DHCP) request message;
receiving a DHCP response message, wherein the DHCP response message provides an Internet Protocol (IP) address, and wherein the IP address facilitates communication by the network device with the network;
receiving controller information, wherein the controller information includes a controller IP address;
requesting provisioning information, wherein the request includes the IP address and the controller IP address;
receiving the provisioning information, wherein:
the provisioning information is associated with the controller IP address;
the provisioning information is associated with a group name; and
the provisioning information allows self-configuration of the network device; and
configuring operation of the network device using the provisioning information associated with the controller IP address and the group name, wherein the group name is included in DHCP option 43 or in DHCP option 60.

56. The method of claim 55, wherein the DHCP response message includes the controller IP address.

57. The method of claim 56, wherein the controller IP address is included in DHCP option 43.

58. The method of claim 56, wherein the controller IP address is included in DHCP option 60.

59. The method of claim 55, further comprising receiving a link layer discovery protocol (LLDP) message, wherein:
an LLDP message includes type-length-value (TLV) structures; and
a TLV includes the controller IP address.

60. The method of claim 55, wherein requesting provisioning information includes contacting a controller associated with the controller IP address.

61. The method of claim 55, wherein receiving provisioning information includes receiving a group name associated with the provisioning information.

62. The method of claim 61, wherein the group name is based on the IP address provided by the DHCP response.

63. The method of claim 55, wherein the provisioning information includes radiofrequency settings.

64. The method of claim 55, wherein the provisioning information includes network identifiers.

65. The method of claim 55, further comprising: transmitting further configuration information, wherein the further configuration information is based on the group name.

66. A network device, comprising:
a processor;
a non-transitory computer-readable medium containing executable by the processor to:
connect to a network;
transmit a dynamic host configuration protocol (DHCP) request message;
receive a DHCP response message, wherein:
the DHCP response message provides an Internet Protocol (IP) address; and
the IP address facilitates communication with the network;

receive controller information, wherein the controller information includes a controller IP address;
request provisioning information, wherein the request includes the IP address and the controller IP address;
receive the provisioning information, wherein:
the provisioning information is associated with the controller IP address;
the provisioning information is associated with a group name; and
provisioning information allows self-configuration of the network device; and
configure operation of the network device using the provisioning information associated with the controller IP address and the group name, wherein the group name is included in DHCP option 43 or in DHCP option 60.

67. The network device of claim 66, wherein the DHCP response message includes the controller IP address.

68. The network device of claim 67, wherein the controller IP address is included in DHCP option 43.

69. The network device of claim 67, wherein the controller IP address is included in DHCP option 60.

70. The network device of claim 66, further comprising instructions executable by the processor to receive a link layer discovery protocol (LLDP) message, wherein:
an LLDP message includes type-length-value (TLV) structures; and
a TLV includes the controller IP address.

71. The network device of claim 66, wherein the instructions to request provisioning information instructions executable to contact the controller associated with the controller IP address.

72. The network device of claim 66, wherein the instructions to receive provisioning information include instructions executable to receive a group name associated with the provisioning information.

73. The network device of claim 72, wherein the group name is based on the IP address provided by the DHCP response.

74. The network device of claim 66, wherein the provisioning information includes radiofrequency settings.

75. The network device of claim 66, wherein the provisioning information includes network identifiers.

76. The network device of claim 66, further comprising instructions executable by the processor to transmit further configuration information, wherein the further configuration information is based on the group name.

77. A non-transitory machine-readable medium including instructions executable by a processor to:
connect to a network;
transmit a dynamic host configuration protocol (DHCP) request message;
receive a DHCP response message, wherein:
the DHCP response message provides an Internet Protocol (IP) address; and
the IP address facilitates communicate on with the network;
receive controller information, wherein the controller information includes a controller IP address;
request provisioning information, wherein the request includes the IP address and the controller IP address;
receive the provisioning information, wherein:
the provisioning information is associated with the controller IP address
the provisioning information is associated with a group name; and
the provisioning information allows self-configuration of the network device; and
configure operation of the network device using the provisioning information associated with the controller IP address and the group name, wherein the group name is included in DHCP option 43 or in DHCP option 60.

78. The non-transitory machine-readable medium of claim 77, wherein the DHCP response message includes the controller IP address.

79. The non-transitory machine-readable medium of claim 78, wherein the controller IP address is included in DHCP option 43.

80. The non-transitory machine-readable medium of claim 78, wherein the controller IP address is included in DHCP option 60.

81. The non-transitory machine-readable medium of claim 77, further comprising-instructions executable by ten process to receive a link layer discovery protocol (LLDP) message, wherein:
an LLDP message includes type-length-value (TLV) structures; and
a TLV includes the controller IP address.

82. The non-transitory machine-readable medium of claim 77, wherein the instructions to request provisioning information include instructions executable to contact the controller associated with the controller IP address.

83. The non-transitory machine-readable medium of claim 77, wherein the instructions to receive provisioning information include instructions executable to receive a group name associated with the provisioning information.

84. The non-transitory machine-readable medium of claim 83, wherein the group name is based on the IP address provided by the DHCP response.

85. The non-transitory machine-readable medium of claim 77, wherein the provisioning information includes radiofrequency settings.

86. The non-transitory machine-readable medium of claim 77, wherein the provisioning information includes network identifiers.

87. The non-transitory machine-readable medium of claim 77, further comprising instructions executable by the processor to transmit further configuration information, wherein the further configuration information is based on the group name.

* * * * *